(12) United States Patent
Medina et al.

(10) Patent No.: US 10,564,778 B2
(45) Date of Patent: *Feb. 18, 2020

(54) DETERMINING FORCE APPLIED TO AN ULTRASONIC SENSOR

(71) Applicant: InvenSense, Inc., San Jose, CA (US)

(72) Inventors: Eitan Medina, Palo Alto, CA (US);
Behrooz Abdi, San Jose, CA (US);
Sam Massih, Danville, CA (US);
Romain Fayolle, Grenoble (FR);
Hao-Yen Tang, San Jose, CA (US)

(73) Assignee: InvenSense, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,161

(22) Filed: Apr. 23, 2019

(65) Prior Publication Data

US 2019/0250771 A1 Aug. 15, 2019

Related U.S. Application Data

(63) Continuation of application No. 15/449,770, filed on Mar. 3, 2017, now Pat. No. 10,296,145.

(Continued)

(51) Int. Cl.
*G06F 3/041* (2006.01)
*G06F 3/043* (2006.01)
(Continued)

(52) U.S. Cl.
CPC .............. *G06F 3/0436* (2013.01); *G01L 1/16* (2013.01); *G06F 3/043* (2013.01); *G06F 3/0414* (2013.01); *G06F 3/0416* (2013.01); *G06K 9/0002* (2013.01)

(58) Field of Classification Search
CPC ....... G01L 1/16; G06F 3/0414; G06F 3/0416; G06F 3/043; G06F 3/0436; G06K 9/0002
See application file for complete search history.

(56) References Cited

U.S. PATENT DOCUMENTS 9,195,879 B1 11/2015 Du et al.
2010/0066697 A1 3/2010 Jacomet et al.
(Continued)

FOREIGN PATENT DOCUMENTS

WO 2014018121 A1 1/2014

OTHER PUBLICATIONS

"ISA/EP, International Search Report and Written Opinion for International Application No. PCT/US2017/020818, 16 pages, dated Jun. 9, 2017 (Jun. 9, 2017)".

(Continued)

*Primary Examiner* — Insa Sadio

(57) ABSTRACT

In a method for determining force applied to an ultrasonic sensor, ultrasonic signals are emitted from an ultrasonic sensor. A plurality of reflected ultrasonic signals from a finger interacting with the ultrasonic sensor is captured. A first data based at least in part on a first reflected ultrasonic signal of the plurality of reflected ultrasonic signals is compared with a second data based at least in part on a second reflected ultrasonic signal of the plurality of reflected ultrasonic signals. A deformation of the finger during interaction with the ultrasonic sensor is determined based on differences between the first data based at least in part on the first reflected ultrasonic signal and the second data based at least in part on the second reflected ultrasonic signal. A force applied by the finger to the ultrasonic sensor is determined based at least in part on the deformation.

35 Claims, 12 Drawing Sheets

Related U.S. Application Data

(60) Provisional application No. 62/344,061, filed on Jun. 1, 2016, provisional application No. 62/302,886, filed on Mar. 3, 2016.

(51) Int. Cl.
*G01L 1/16* (2006.01)
*G06K 9/00* (2006.01)

(56) References Cited

U.S. PATENT DOCUMENTS

2014/0354905 A1* 12/2014 Kitchens ............... G06F 1/3215 349/12
2015/0016223 A1* 1/2015 Dickinson ............... G06F 3/043 367/87
2016/0054826 A1 2/2016 Huppi et al.
2017/0255338 A1 9/2017 Medina et al.

OTHER PUBLICATIONS

Lamberti, et al., "A high frequency cMUT probe for ultrasound imaging of fingerprints", Sensors and Actuators A: Physical, Elsevier B.V., Sep. 29, 2011, 561-569.

Maev, et al., "High-speed biometrics ultrasonic system for 3D fingerprint imaging", SPIE—International Society for Optical Engineering. Proceedings vol. 8546, Oct. 30, 2012, 85460B-1 to 85460B-6.

Schmitt, et al., "Ultrasonic Imaging of Fingerprints using Acoustical Impediography", 2004 IEEE Ultrasonics Symposium, vol. 1, Aug. 23, 2004, 680-688.

Tang, et al., "11.2 3D Ultrasonic Fingerprint Sensor-on-a-Chip", 2016 IEEE International Solid-State Circuits Conference, IEEE, Jan. 31, 2016, 202-203.

* cited by examiner

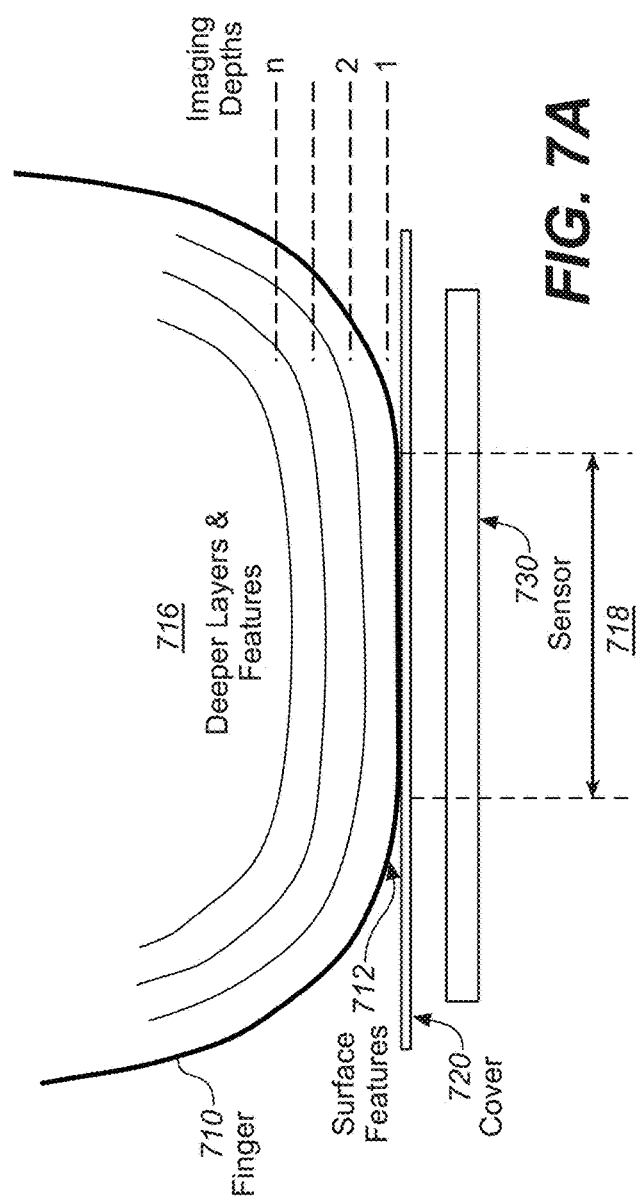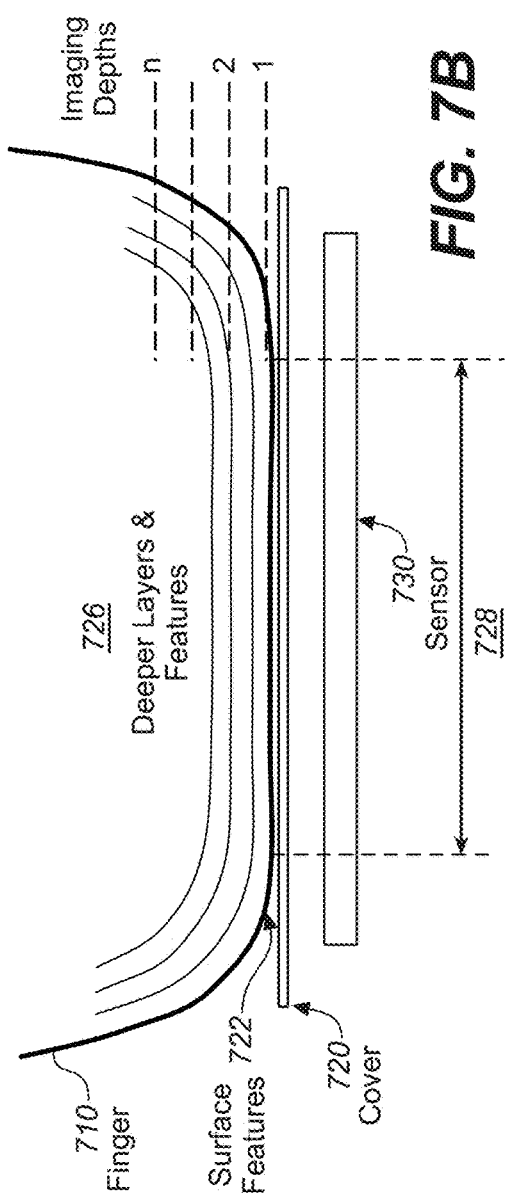

DETERMINING FORCE APPLIED TO AN ULTRASONIC SENSOR

RELATED APPLICATIONS

This application is a continuation of and claims priority to and benefit of co-pending U.S. patent application Ser. No. 15/449,770 filed on Mar. 3, 2017, entitled "DETERMINING FORCE APPLIED TO AN ULTRASONIC SENSOR" by Medina et al., and assigned to the assignee of the present application, the disclosure of which is hereby incorporated herein by reference in its entirety.

The patent application with application Ser. No. 15/449, 770 claims priority to and the benefit of U.S. Patent Provisional Patent Application 62/302,886, filed on Mar. 3, 2016, entitled "FORCE TOUCH SENSOR USING ULTRASONIC IMAGING," by Medina et al., and assigned to the assignee of the present application, which is incorporated herein by reference in its entirety.

The patent application with application Ser. No. 15/449, 770 also claims priority to and the benefit of U.S. Provisional Patent Application 62/344,061, filed on Jun. 1, 2016, entitled "FORCE TOUCH SENSOR USING ULTRASONIC IMAGING: NAVIGATION MODES," by Fayolle et al., and assigned to the assignee of the present application, which is incorporated herein by reference in its entirety.

BACKGROUND

Electronic devices having touch screens that can detect the force with which the user touches the screen exist today in smartphones. With these screens the system can detect where the users touches the screen and with which force. This enables additional options for the implementation of applications and the user interface. Implementing force detection functionality into a touch screen requires an additional sensing layer on the entire screen of the electronic device, which requires additional componentry as well as manufacturing steps and costs.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 7A and 7B illustrate cross section views of an example ultrasonic sensor and a finger, according to some embodiments.

DESCRIPTION OF EMBODIMENTS

Figure 1:
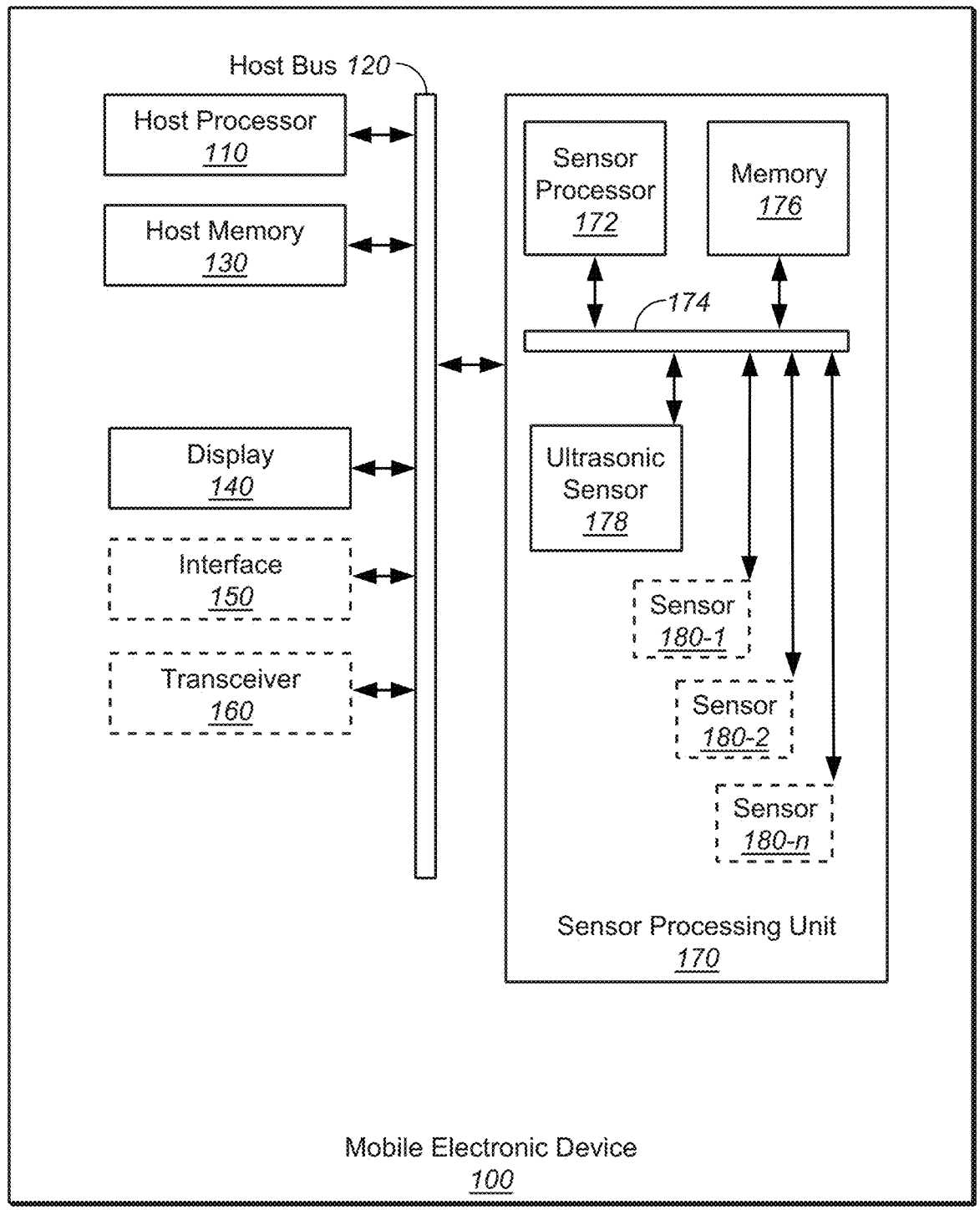
FIG. 1 is a block diagram of an example mobile electronic device 100 upon which embodiments described herein may be implemented.

The following Description of Embodiments is merely provided by way of example and not of limitation. Furthermore, there is no intention to be bound by any expressed or implied theory presented in the preceding background or brief summary, or in the following detailed description.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Some portions of the detailed descriptions which follow are presented in terms of procedures, logic blocks, processing and other symbolic representations of operations on data within an electrical circuit. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "emitting," "capturing," "comparing," "determining," "using," "providing," or the like, refer to the actions and processes of an electronic device such as an electrical circuit.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example mobile electronic device with which or upon which various embodiments described herein may be implemented. Example operations of a two-dimensional array of ultrasonic transducers are then described. Example force determination and navigation using an ultrasonic sensor are then described.

Example Mobile Electronic Device

Turning now to the figures, FIG. 1 is a block diagram of an example mobile electronic device 100. As will be appreciated, mobile electronic device 100 may be implemented as a device or apparatus, such as a handheld mobile electronic device. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices.

As depicted in FIG. 1, mobile electronic device 100 may include a host processor 110, a host bus 120, a host memory 130, a display device 140, and a sensor processing unit 170. Some embodiments of mobile electronic device 100 may further include one or more of an interface 150, a transceiver 160 (all depicted in dashed lines) and/or other components. In various embodiments, electrical power for mobile electronic device 100 is provided by a mobile power source such as a battery (not shown), when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of mobile electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit (SPU) 170, and other components of mobile electronic device 100 may be coupled communicatively through host bus 120 in order to exchange commands and data. Depending on the architecture, different bus configurations may be employed as desired. For example, additional buses may be used to couple the various components of mobile electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for mobile electronic device 100 to control and manage system resources in real time, enable functions of application software and other layers, and interface application programs with other software and functions of mobile electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single mobile electronic device 100, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at mobile electronic device 100 from an external transmission source and transmission of data from mobile electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Mobile electronic device 100 also includes a general purpose sensor assembly in the form of integrated SPU 170 which includes sensor processor 172, memory 176, an ultrasonic sensor 178, and a bus 174 for facilitating communication between these and other components of SPU 170. In some embodiments, SPU 170 may include at least one sensor 180 (shown as sensor 180-1, 180-2, . . . 180-n) communicatively coupled to bus 174. In some embodiments, all of the components illustrated in SPU 170 may be embodied on a single integrated circuit. It should be appreciated that SPU 170 may be manufactured as a stand-alone unit (e.g., an integrated circuit), that may exist separately from a larger electronic device.

Sensor processor 172 can be one or more microprocessors, CPUs, DSPs, general purpose microprocessors, ASICs, ASIPs, FPGAs or other processors which run software programs, which may be stored in memory 176, associated with the functions of SPU 170.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 172, memory 176, sensor 178, and other components of SPU 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store algorithms or routines or other instructions for processing data received from ultrasonic sensor 178 and/or one or more sensor 180, as well as the received data either in its raw form or after some processing. Such algorithms and routines may be implemented by sensor processor 172 and/or by logic or processing capabilities included in ultrasonic sensor 178 and/or sensor 180.

A sensor 180 may comprise, without limitation: a temperature sensor, a humidity sensor, an atmospheric pressure sensor, an infrared sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental quantities. In one example, sensor 180-1 may comprise an acoustic sensor, sensor 180-2 may comprise a second acoustic sensor, and sensor 180-$n$ may comprise a motion sensor.

In some embodiments, ultrasonic sensor 178 and/or one or more sensors 180 may be implemented using a microelectromechanical system (MEMS) that is integrated with sensor processor 172 and one or more other components of SPU 170 in a single chip or package. Although depicted as being included within SPU 170, one, some, or all of ultrasonic sensor 178 and/or one or more sensors 180 may be disposed externally to SPU 170 in various embodiments.

Example Operation of a Two-Dimensional Array of Ultrasonic Transducers

Figure 2:
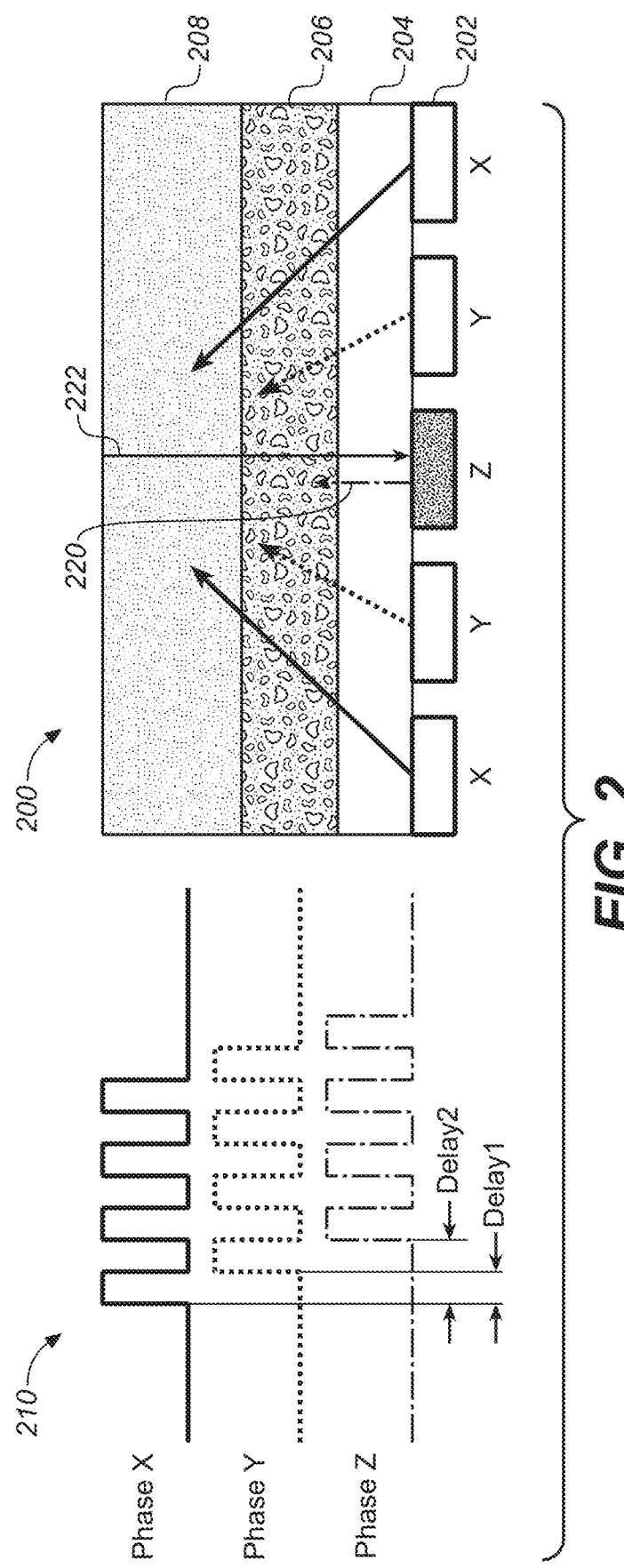
FIG. 2 illustrates an example ultrasonic transducer system with phase delayed transmission, according to some embodiments.

FIG. 2 illustrates an example ultrasonic transducer system 200 with phase delayed transmission, according to some embodiments. As illustrated, FIG. 2 shows ultrasonic beam transmission and reception using a one-dimensional, five-element, ultrasonic transducer system 200 having phase delayed inputs 210. In various embodiments, ultrasonic transducer system 200 is comprised of PMUT devices having a center pinned membrane. In one embodiment, ultrasonic transducer system 200 is ultrasonic sensor 178 of FIG. 1.

As illustrated, ultrasonic transducer system 200 includes five ultrasonic transducers 202 including a piezoelectric material and activating electrodes that are covered with a continuous stiffening layer 204 (e.g., a mechanical support layer). Stiffening layer 204 contacts acoustic coupling layer 206, and in turn is covered by a platen layer 208. In various embodiments, the stiffening layer 204 can be silicon, and the platen layer 208 formed from glass, sapphire, or polycarbonate or similar durable plastic. It should be appreciated that stiffening layer 204 and platen layer 208 are optional. For example, acoustic coupling layer 206 can operate as a single layer providing for transmission of ultrasonic signals and serve as a contact surface for ultrasonic transducer system 200. In another embodiment, acoustic coupling layer 206 can provide for transmission of ultrasonic signals in conjunction with one of stiffening layer 204 and platen layer 208.

The intermediately positioned acoustic coupling layer 206 can be formed from a plastic, epoxy, or gel such as polydimethylsiloxane (PDMS) or other material. In one embodiment, the material of acoustic coupling layer 206 has an acoustic impedance selected to be between the acoustic impedance of layers 204 and 208. In one embodiment, the material of acoustic coupling layer 206 has an acoustic impedance selected to be close the acoustic impedance of platen layer 208, to reduce unwanted acoustic reflections and improve ultrasonic beam transmission and sensing. However, alternative material stacks to the one shown in FIG. 2 may be used and certain layers may be omitted, provided the medium through which transmission occurs passes signals in a predictable way.

In operation, and as illustrated in FIG. 2, the ultrasonic transducers 202 labelled with an "x" are triggered to emit ultrasonic waves at an initial time. At a second time, (e.g., 1-100 nanoseconds later), the ultrasonic transducers 202 labelled with a "y" are triggered. At a third time (e.g., 1-100 nanoseconds after the second time) the ultrasonic transducer 202 labelled with a "z" is triggered. The ultrasonic waves interfere transmitted at different times cause interference with each other, effectively resulting in a single high intensity beam 220 that exits the platen layer 208, contacts objects, such as a finger (not shown), that contact the platen layer 208, and is in part reflected back to the ultrasonic transducers. In one embodiment, the ultrasonic transducers 202 are switched from a transmission mode to a reception mode, allowing the "z" ultrasonic transducer to detect any reflected signals 222. In other words, the phase delay pattern of the ultrasonic transducers 202 is symmetric about the focal point where high intensity beam 220 exits platen layer 208.

It should be appreciated that in accordance with various embodiments, high intensity beam 220 can be formed to have a focal point at different distances above ultrasonic transducers 202. In one embodiment, high intensity beam 220 can be formed to have a focal point at the outer surface of platen layer 208 for capturing a pixel of an object interacting with ultrasonic transducer system 200. For example, high intensity beam 220 can be formed to capture pixels of an image of the outer surface of the epidermis of a finger (e.g., a fingerprint). In other embodiments, high intensity beam 220 can be formed to have a focal point beyond the outer surface of platen layer 208 for capturing a pixel of an object interacting with ultrasonic transducer system 200. For example, high intensity beam 220 can be formed to capture pixels of an image of a predetermined depth within the dermis of a finger (e.g., a deeper layer within the finger). According the various embodiments, beam forming can be used to capture images of various depths into a finger interacting with ultrasonic transducer system 200. While beam forming is one method for capturing different imaging depths of an object interacting with ultrasonic transducer system 200, it should be appreciated that other methods for capturing images at different internal depths may also be used in accordance with the described embodiments.

It should be appreciated that an ultrasonic transducer 202 of ultrasonic transducer system 200 may be used to transmit and/or receive an ultrasonic signal, and that the illustrated embodiment is a non-limiting example. The received signal (e.g., generated based on reflections, echoes, etc. of the acoustic signal from an object contacting or above the platen layer 208) can then be analyzed. As an example, an image of the object, a distance of the object from the sensing component, acoustic impedance of the object, a motion of the object, etc., can all be determined based on comparing a frequency, amplitude, phase and/or arrival time of the received signal with a frequency, amplitude, phase and/or transmission time of the transmitted acoustic signal. If the object is, for example, a finger, various characteristics (e.g. density and/or other acoustic properties) of the layers and features of the finger may be determined. Moreover, results generated can be further analyzed or presented to a user via a display device (not shown).

Figure 3:
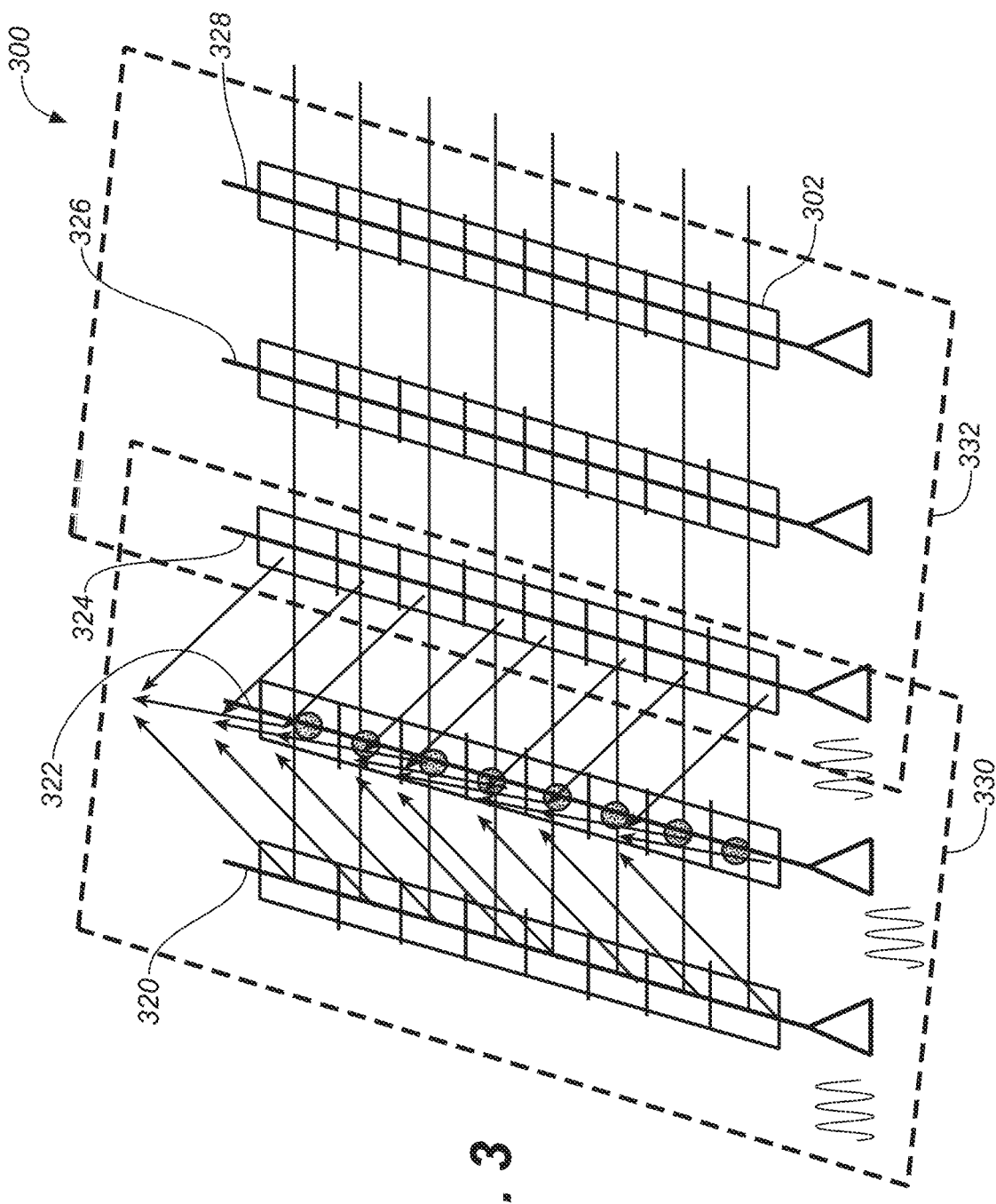
FIG. 3 illustrates another example ultrasonic transducer system with phase delayed transmission, according to some embodiments.

FIG. 3 illustrates another example ultrasonic transducer system 300 with phase delayed transmission, according to some embodiments. As illustrated, FIG. 3 shows ultrasonic beam transmission and reception using a virtual block of two-dimensional, 24-element, ultrasonic transducers that form a subset of a 40-element ultrasonic transducer system 300 having phase delayed inputs. In operation, an array position 330 (represented by the dotted line), also referred to herein as a virtual block, includes columns 320, 322 and 324 of ultrasonic transducers 302. At an initial time, columns 320 and 324 of array position 330 are triggered to emit ultrasonic waves at an initial time. At a second time (e.g., several nanoseconds later), column 322 of array position 330 is triggered. The ultrasonic waves interfere with each other, substantially resulting in emission of a high intensity ultrasonic wave centered on column 322. In one embodiment, the ultrasonic transducers 302 in columns 320 and 324 are switched off, while column 322 is switched from a transmission mode to a reception mode, allowing detection of any reflected signals.

In one embodiment, after the activation of ultrasonic transducers 302 of array position 330, ultrasonic transducers 302 of another array position 332, comprised of columns 324, 326, and 328 of ultrasonic transducers 302 are triggered in a manner similar to that described in the foregoing description of array position 330. In one embodiment, ultrasonic transducers 302 of another array position 332 are activated after a detection of a reflected ultrasonic signal at column 322 of array position 330. It should be appreciated that while movement of the array position by two columns of ultrasonic transducers is illustrated, movement by one, three, or more columns rightward or leftward is contemplated, as is movement by one or more rows, or by movement by both some determined number of rows and columns. In various embodiments, successive array positions can be either overlapping in part, or can be distinct. In some embodiments the size of array positions can be varied. In various embodiments, the number of ultrasonic transducers 302 of an array position for emitting ultrasonic waves can be larger than the number of ultrasonic transducers 302 of an array position for ultrasonic reception. In still other embodiments, array positions can be square, rectangular, ellipsoidal, circular, or more complex shapes such as crosses.

Example ultrasonic transducer system 300 is operable to beamform a line of a high intensity ultrasonic wave centered over column 322. It should be appreciated that the principles illustrated in FIG. 3 for beamforming a line using columns of ultrasonic transducers is applicable to embodiments for beamforming a point using ultrasonic transducers, as will be explained below. For instance, example ultrasonic transducer system 300 includes columns of ultrasonic transducers in which the ultrasonic transducers of each column are jointly operated to activate at the same time, operating to beamform along a line. It should be appreciated that the ultrasonic transducers of a two-dimensional array may be independently operable, and used for beamform points as well, as will be described below. Moreover, it should be appreciated that ultrasonic transducer system 300 is able to beamform a line to a particular distance over column 322. Similarly, an ultrasonic transducer system for beamforming points may beamform a point to a particular distance about the ultrasonic transducer system. In such a manner, a line or a point may be formed to have a focal point at different depths into an object interacting with an ultrasonic transducer system.

Figure 4:
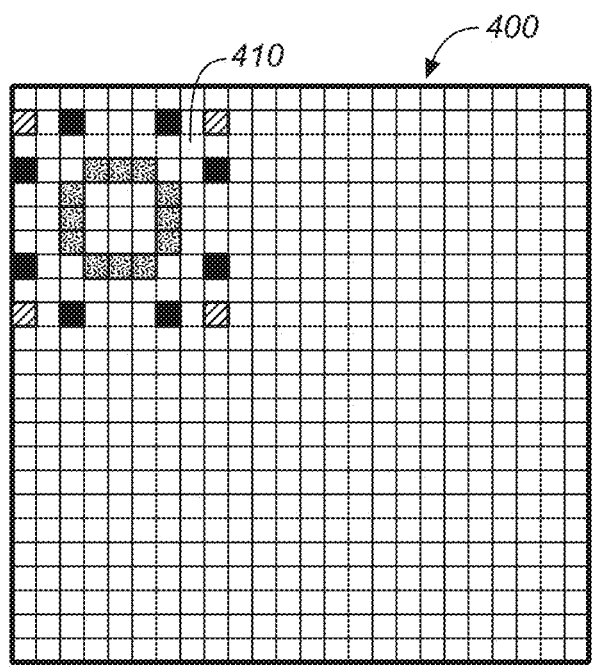
FIG. 4 illustrates an example phase delay pattern for a 9×9 ultrasonic transducer array position, according to some embodiments.

FIG. 4 illustrates example two-dimensional array 400 of ultrasonic transducers according to an embodiment. FIG. 4 illustrates phase delay pattern 410, indicating ultrasonic transducers that are activated for forming a beam to a point at the center of phase delay pattern 410. As illustrated, phase delay pattern 410 is a three phase (indicated using different hatch patterns) activated phase delay pattern of ultrasonic transducers in a 9×9 array position that is used to generate an ultrasonic beam with a focus point at the center of phase delay pattern 410 and having a particular depth above two-dimensional array 400.

Figure 5:
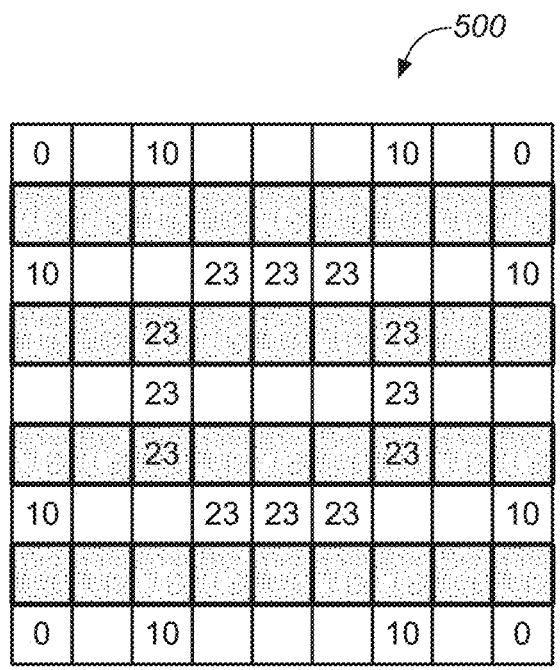
FIG. 5 illustrates an example phase delay pattern for ultrasonic signal transmission of a 9×9 ultrasonic transducer block of a two-dimensional array of ultrasonic transducers, according to some embodiments.

FIG. 5 illustrates an example phase delay pattern 500 for ultrasonic signal transmission of a 9×9 ultrasonic transducer block of a two-dimensional array of ultrasonic transducers, according to some embodiments. For example, phased delay pattern 500 may be used as phase delay pattern 410 of FIG. 4. As illustrated in FIG. 5, each number in the ultrasonic transducer array is equivalent to the nanosecond delay used during operation, and an empty element (e.g., no number) in phase delay pattern 500 means that an ultrasonic transducer is not activated for signal transmission during operation. In various embodiments, ultrasonic wave amplitude can be the same or similar for each activated ultrasonic transducer, or can be selectively increased or decreased relative to other ultrasonic transducers. In the illustrated pattern, initial ultrasonic transducer activation is limited to ultrasonic transducers in the corners of phase delay pattern 500, followed 10 nanoseconds later by a rough ring of ultrasonic transducers around the edges of phase delay pattern 500. After 23 nanoseconds, an interior ring of ultrasonic transducers is activated of phase delay pattern 500. Together, the twenty-four activated ultrasonic transducers generate an ultrasonic beam centered on phase delay pattern 500 and focused to a particular depth above the 9×9 ultrasonic transducer block. In other words, phase delay pattern 500 is symmetric about the focal point where a high intensity beam contacts or penetrates an object.

It should be appreciated that different ultrasonic transducers of phase delay pattern 500 may be activated for receipt of reflected ultrasonic signals. For example, the center 3×3 ultrasonic transducers of phase delay pattern 500 may be activated to receive the reflected ultrasonic signals. In another example, the ultrasonic transducers used to transmit the ultrasonic signal are also used to receive the reflected ultrasonic signal. In another example, the ultrasonic transducers used to receive the reflected ultrasonic signals include at least one of the ultrasonic transducers also used to transmit the ultrasonic signals.

Figure 6:
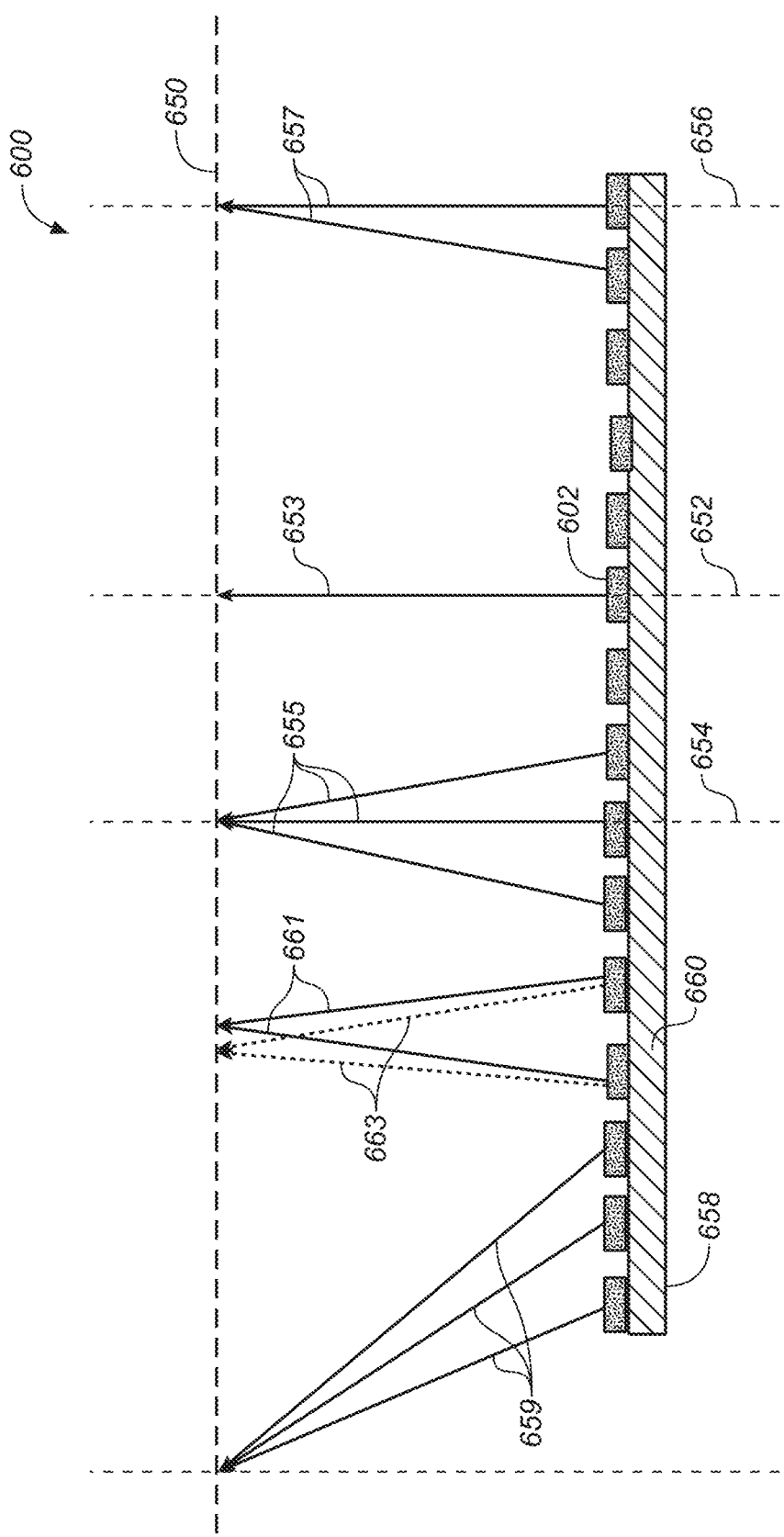
FIG. 6 illustrates an example ultrasonic transducer system with phase delayed transmission, according to some embodiments.

FIG. 6 illustrates an example ultrasonic transducer system 600 with phase delayed transmission, according to some embodiments. FIG. 6 shows five different modes of ultrasonic beam transmission using an example one-dimensional, fifteen-element, ultrasonic transducer system 600 having phase delayed inputs. As illustrated, ultrasonic transducers 602 can be operated in various modes to provide ultrasonic beam spots focused along line 650 (e.g., a top of a platen layer or a depth penetrating into an object). In a first mode, a single ultrasonic transducer 652 is operated to provide a single broad ultrasonic beam having a peak amplitude centered on arrow 653. In a second mode, multiple ultrasonic transducers in a symmetrical pattern 654 about the center ultrasonic transducer are sequentially triggered to emit ultrasonic waves at differing initial times. As illustrated, a center located transducer is triggered at a delayed time with respect to surrounding transducers (which are triggered simultaneously). The ultrasonic waves interfere with each other, resulting in a single high intensity beam 655. In a third mode, for ultrasonic transducers 656 located adjacent to or near an edge of the ultrasonic transducer system 600, an asymmetrical triggering pattern can be used to produce beam 657. In a fourth mode, asymmetrical triggering patterns for transducers 658 can be used to steer an ultrasound beam to an off-center location 659. A shown, the focused beam 659 can be directed to a point above and outside boundaries of the ultrasonic transducer system 600. In a fifth mode, the beam can be steered to focus at a series of discrete positions, with the beam spacing having a pitch less than, equal to, or greater than a pitch of the ultrasonic transducers. In FIG. 6, transducers 660 are triggered at separate times to produce beam spots separated by a pitch less than that of the ultrasonic transducers (indicated respectively by solid lines directed to form beam spot 661 and dotted lines to form beam spot 663). It should be appreciated that in accordance with various embodiments ultrasonic transducers of ultrasonic transducer system 600 can be arranged into blocks of ultrasonic transducers, wherein each block of ultrasonic transducers is collectively controllable.

Example Force Determination and Navigation Using an Ultrasonic Sensor

Embodiments described herein provide for the integration of an ultrasound sensor (also referred to herein as an "ultrasonic sensor" or an "ultrasonic imaging sensor") in a mobile device. In various embodiments, the ultrasonic sensor may be capable of capturing the fingerprint of a user of the device.

FIGS. 7A and 7B illustrate cross section views of an example ultrasonic sensor 730 and a finger 710, according to some embodiments. With reference to FIG. 7A, finger 710 is shown interacting with ultrasonic sensor 730. It should be appreciated that the dimensions of ultrasonic sensor 730 may be chosen to capture only a small section of the fingerprint of finger 710, or the dimensions of ultrasonic sensor 730 may be chosen larger to capture substantially the complete fingerprint. In one embodiment, a cover 720 overlies ultrasonic sensor 730. In various embodiments, cover 720 may be made of transparent material, e.g., a thin sheet of glass, or other thin opaque materials, such as, but not limited to plastic, resin, rubber, Teflon, epoxy, glass, aluminum-based alloys, sapphire, titanium nitride (TiN), Silicon carbide (SiC), diamond, etc. For example, cover 720 may provide protection for ultrasonic sensor 730 by preventing a user from coming into contact with ultrasonic sensor 730. It should be appreciated that ultrasonic sensor 730 may be in direct contact with cover 720, or there may be a gap separating ultrasonic sensor 730 and cover 720. In various embodiments, the gap may be filled with an acoustic coupling material including air, solid liquid, gel-like materials, or other materials for supporting transmission of acoustic signals.

Ultrasonic sensor 730 may be incorporated on the different exterior faces of an electronic device (e.g., mobile electronic device 100 of FIG. 1), depending on the ergonomics and easy for the user to interact with ultrasonic sensor 730 using a finger 710. For example, if the electronic device includes a display, ultrasonic sensor 730 may be included in the same side as the display, behind the display, on an edge of the electronic device, or on the back of the electronic device. In accordance with some embodiments, ultrasonic sensor 730 may be incorporated in a button of the electronic device. In some embodiments, visual or textural markers may be present on cover 720 to indicate to the user where ultrasonic sensor 730 is positioned and where to put finger 710.

Ultrasonic sensor 730 may provide multiple functionalities. For instance, in addition to being operable capture the fingerprint of the user, ultrasonic sensor 730 may also be used to determine the force applied by the user (e.g., the force of finger 710 applied to ultrasonic sensor 730), and may further be used to provide navigational functionality. The different functionalities or modes may be selected and/or activated automatically, for example, depending on the context or application of the device, and the different functionalities or modes may be adaptive to the user and the user's habits or preferences. In the force detection mode, the sensor may require more power and processing resources, and therefore the force detection mode may only be activated when useful. In some embodiments, the parameters of the force detection process may be adapted to use less power or computing resources, which may come at the costs of quality or confidence in the determined force. In some embodiments, the force detection process may be disabled based on the available power or computing resources. Embodiments described herein pertain to methods to derive the applied force and methods for navigation.

Ultrasonic sensor 730 is operable to emit and detect ultrasonic waves (also referred to as ultrasonic signals or ultrasound signals). The emitted ultrasonic waves are reflected from any objects in front of ultrasonic sensor 730, and these reflected ultrasonic waves, or echoes, are then detected. Where the object is a finger (e.g., finger 710), the waves are reflected from different features of the finger, such as the surface features (e.g., surface features 712 of FIG. 7A and surface features 722 of FIG. 7B) on the skin (e.g., the epidermis), or features (e.g., features 716 of FIG. 7A and surface features 726 of FIG. 7B) present in deeper layers of the finger (e.g., the dermis). Examples of surface features of a finger are ridges and valleys of a fingerprint. For example, the reflection of the sound waves from the ridge/valley pattern enables ultrasonic sensor 730 to produce a fingerprint image that may be used for identification of the user. In optical fingerprint sensors, the same principle of emission and reflection are used to detect the fingerprint. However, in contrast to the optical waves (of visible wavelengths) that reflect from the outside of the skin (surface features), the ultrasound waves may penetrate further into the skin of the finger and enable the capture of deeper layers and features. Therefore, ultrasonic sensor 730 is able to provide depth information, from which a multi-dimensional fingerprint may be determined, such as e.g. a 3D fingerprint.

It should be appreciated that the features that can reflect ultrasonic waves, and used to determine deformation, may be any anatomical feature from the different layers of the finger, e.g., the epidermis layer, the dermis layer, or subcutaneous tissue. The features may be the layers itself, transitions between different layers, features within the layers (e.g., pores), or features traversing the layers (e.g., capillary blood vessels). Which features may be used depends on the penetration depth of the ultrasound waves and the imaging resolution. The features need not directly be the anatomical features, but may be features of ultrasonic signals caused by the anatomical features, such as specific reflections or absorptions of the signal.

In order to obtain the 3D fingerprint, the depth information is detected using ultrasonic sensor 730. The depth information can be obtained due to the fact that the ultrasonic waves reflect from features at different depths in the skin. The reflection time, which is defined as the time between the emission of the ultrasonic waves and the detection of the reflected ultrasonic waves, increases as a function of the depth of the features. Therefore, by analyzing the reflected waves as a function of time, the features can be determined as a function of depth. Any one or combination of the beam forming techniques discussed in relation to FIG. 2 through FIG. 6 may be used for optimizing signals from a certain depth or from a certain layer. Images can be created that correspond to a certain depth within a finger. An array of images of different depths may be defined as the 3D fingerprint. Images may also be created to visualize other cross sections of the finger, for example perpendicular to the cover surface or sensor surface. Fingerprints or 3D fingerprint may not just be defined as images, but also as multi-dimensional data corresponding to various (acoustic) properties of the finger (e.g. density, acoustic absorption, acoustic reflection).

Figure 7C:
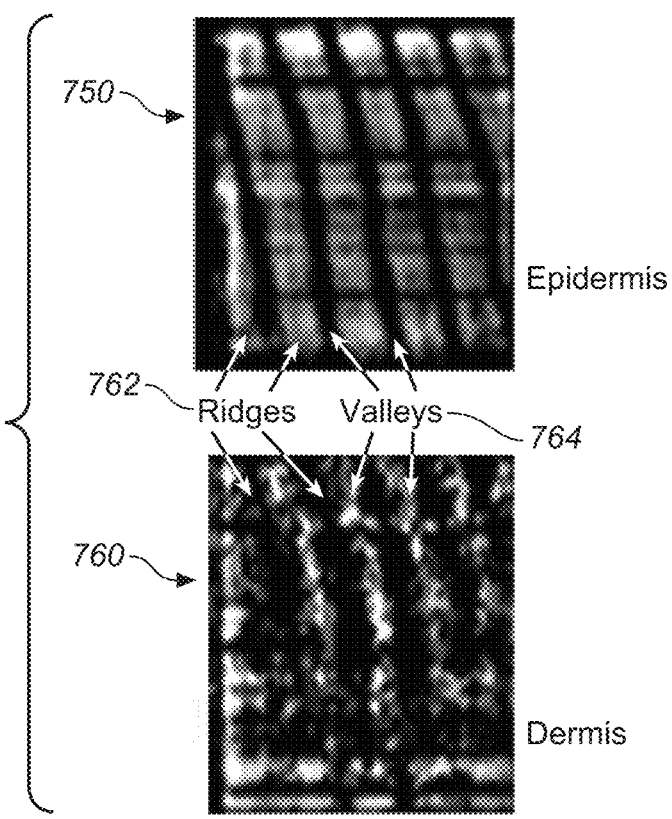
FIG. 7C illustrates examples of images of a finger taken at different depths, according to some embodiments.

FIG. 7C illustrates examples of images of a finger taken at different depths, according to some embodiments. Image 750 is an image of the epidermis of a finger and image 760 is an image of the dermis of the same finger. Ridges 762 and valleys 764 illustrate the features of images 750 and 760, and how the features correspond to each other. It should be appreciated that in image 750 the valleys appear dark due to reflection at air interference and the ridges appear light due to the ultrasonic wave passing into the epidermis, while in image 760 the valleys appear light as they are shadowed by the epidermis valleys and the ridges appear dark due to the reflection at the dermis.

As illustrated in FIGS. 7A and 7B, a finger 710 interacting with ultrasonic sensor 730 and in contact with cover 720. FIGS. 7A and 7B show finger 710 contacting cover 720 with a different force, as illustrated by the different compression of dermal layers and features and a different size of a contact region. With reference to FIG. 7A, finger 710 is in contact with cover 720 at contact region 718, where contact region 718 defines the portion of the surface of finger 710 that is in contact with cover 720. Similarly, with reference to FIG. 7B, finger 710 is in contact with cover 720 at contact region 728, where contact region 728 is larger than contact region 718. Moreover, dermal layers and features 716 of FIG. 7A are spaced farther apart than dermal layers and features 726 of FIG. 7B. Thus, finger 710 is contacting cover 720 with a larger force in FIG. 7B than in FIG. 7A.

It should be appreciated that the force that is applied to cover 720 is not instantaneous, but rather increases from when the user starts touching cover 720 until reaching a maximum, after which the force may decrease if the user removes finger 710. Therefore, by obtaining the reflected ultrasonic signals as a function of time the change of depth of the features can be determined, and the force may be determined (as a function of time). In one embodiment, a correction may be made for the distance from ultrasonic sensor 730 to cover 720 that finger 710 contacts. For instance, FIG. 7A may illustrate finger 710 just after contacting cover 720 and FIG. 7B may illustrate finger 710 contacting cover 720 at a maximum force, as illustrated by the increased compression of dermal layers and features 726 as compared to dermal layers and features 716 and the increased size of contact region 728 as compared to contact region 718.

Figure 8:
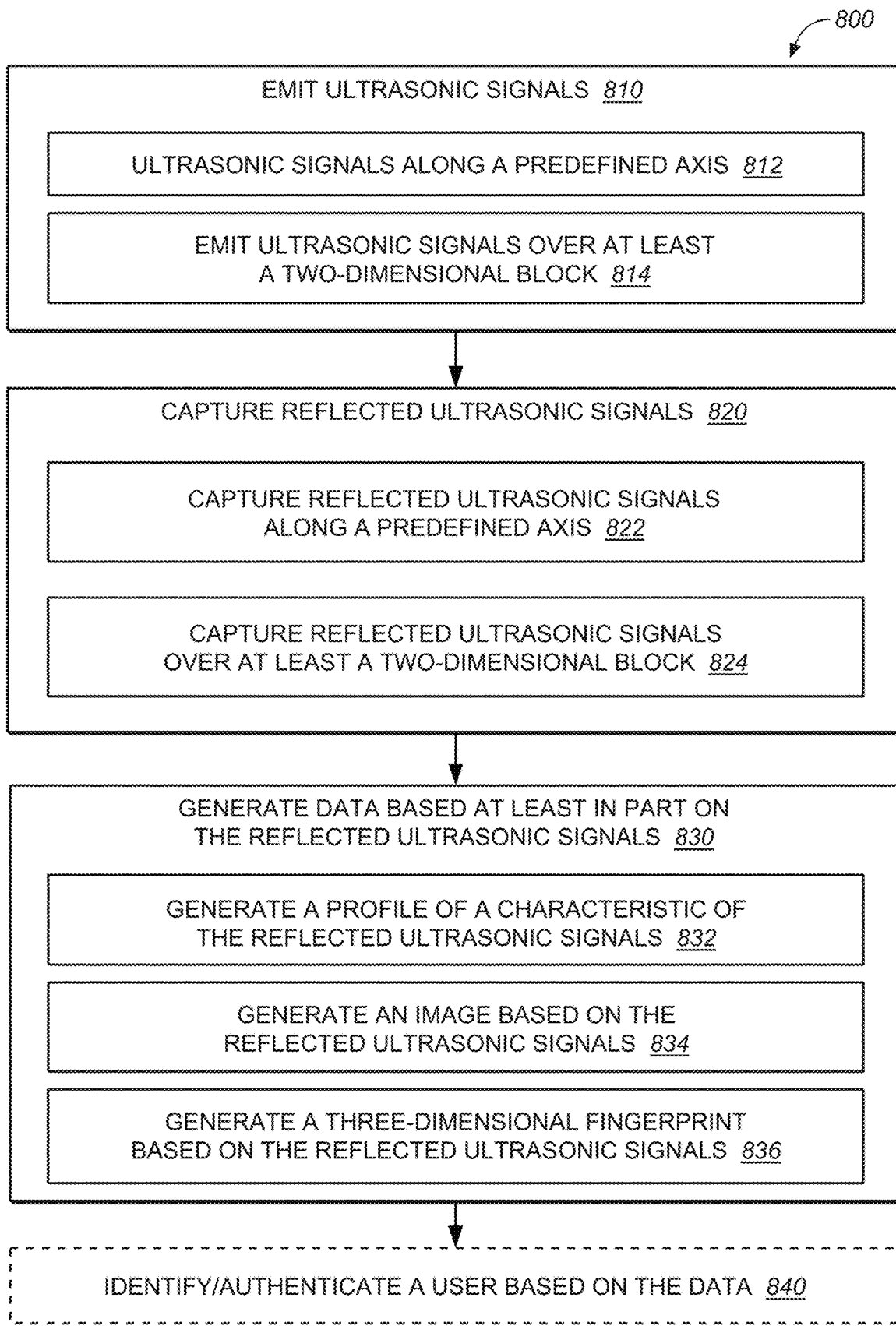
FIG. 8 illustrates a flow diagram of an example method for capturing data based on reflected ultrasonic signals, according to various embodiments.

FIG. 8 illustrates a flow diagram 800 of an example method for capturing data based on reflected ultrasonic signals, according to various embodiments. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 800 includes some procedures that, in various embodiments, are carried out by one or more processors (e.g., host processor 110 or sensor processor 172 of FIG. 1) under the control of computer-readable and computer-executable instructions that are stored on non-transitory computer-readable storage media. It is further appreciated that one or more procedures described in flow diagram 800 may be implemented in hardware, or a combination of hardware with firmware and/or software.

In one embodiment, at procedure 810 of flow diagram 800, an ultrasonic sensor (e.g., ultrasonic sensor 730 of FIGS. 7A and 7B) emits ultrasonic waves that are reflected from features of the finger (e.g., finger 710 of FIGS. 7A and 7B). It should be appreciated that the ultrasonic waves can be reflected from surface features of the finger as well as deeper features within the finger. In one embodiment, the ultrasonic waves are emitted along a predefined axis of the finger. In another embodiment, the ultrasonic waves are emitted across an area of the ultrasonic sensor, and the area may be of any shape or form, such as e.g. a square, a rectangle, a line, etc. In one embodiment, flow diagram 800 commences when a finger is detected. The detection of a finger may be done by activating only a small section of the ultrasonic sensor in order to reduce power demands. When the presence of a finger is detected, for example by the detection of a ridge\valley pattern, the entire ultrasonic sensor may be activated.

In one embodiment, as shown at procedure 812, the ultrasonic waves are emitted along a predefined axis. For example, the predefined axis is perpendicular to the surface of the ultrasonic sensor. In one embodiment, as shown at procedure 814, the ultrasonic waves are emitted over at least a one-dimensional or two-dimensional block of ultrasonic transducers of the ultrasonic sensor. For example, ultrasonic signals are emitted over an area of the ultrasonic sensor, such as a 2×2 or larger grouping of reflected ultrasonic waves.

At procedure 820, the reflected ultrasonic waves are detected/captured at the ultrasonic sensor. In one embodiment, as shown at procedure 822, the reflected ultrasonic waves are captured along a predefined axis. For example, the predefined axis is perpendicular to the surface of the ultrasonic sensor. It should be appreciated that the predefined axis may be defined relative to the ultrasonic sensor or may be defined relative to the finger interacting with the ultrasonic sensor. For example, the predefined axis may be a static set of ultrasonic transducers for capturing ultrasonic signals (e.g., the ultrasonic transducers of the ultrasonic sensor do not change). In another example, the predefined axis is static relative to the finger interacting with the ultrasonic sensor and dynamic relative to the ultrasonic sensor (e.g., as the finger moves/rotates relative to the ultrasonic sensor, the ultrasonic transducers of the ultrasonic sensor that emit and capture the reflected ultrasonic signals move/rotate with the finger). A surface scan may be performed, requiring less time and resources, to verify the position of the finger, and adjust, if needed the position of the axis in order to maintain the position with respect to the finger. In one embodiment, where the predefined axis is static relative to the finger and the finger moves/rotates relative to the ultrasonic sensor, procedure 810 is updated to emit ultrasonic signals along the appropriate predefined axis.

In one embodiment, as shown at procedure 824, the reflected ultrasonic waves are captured over at least a one-dimensional or two-dimensional block of ultrasonic transducers of the ultrasonic sensor. For example, ultrasonic signals are captured over an area of the ultrasonic sensor, such as a 2×2 or larger grouping of reflected ultrasonic waves.

At procedure 830, data is generated based at least in part on the reflected ultrasonic signals. In one embodiment, as shown at procedure 832, a profile of at least one characteristic of the reflected ultrasonic signals is generated. In one embodiment, the at least one characteristic represents a characteristic of the reflected ultrasonic signals (e.g., reflected signal strength). In one embodiment, the at least one characteristic represents a characteristic of the finger tissue derived from the reflected ultrasonic signals, such as e.g. tissue density or signal absorption. In one embodiment, the at least one characteristic represents a feature of the finger derived from the reflected ultrasonic signals. In one embodiment, where the reflected ultrasonic signals are captured along a predefined axis, the data represents the at least one characteristic as a function of depth into the finger. In one embodiment, the data represents the at least one characteristic as a function of depth for at least one position of the finger. For example, the profile includes the depth for the center of the fingerprint and for ridges of the fingerprint.

In one embodiment, the depth information is extracted from the reflected ultrasonic waves. The different imaging depths of the individual layers that are analyzed depend on the settings, such as the timing and the emitted power (e.g., 10 um, 20 um, 30 um, 40 um etc.) For example, for very low depths, which substantially limit the info to the ridge/valley pattern, the timing intervals of the different layers are small and relatively low power is required. For capturing the deeper layers, the timing intervals may be larger, and also more power may be required.

In one embodiment, as shown at procedure 834, an image based on the reflected ultrasonic signals is generated. In one embodiment, the image is generated for a particular depth, wherein the image illustrates features of the finger at the particular depth. In one embodiment, as shown at procedure 836, a 3D fingerprint is generated based on the ultrasonic signals. In one embodiment, the 3D fingerprint is generated by generating images of the finger at different depths, and arranging them into an array. In one embodiment, the 3D fingerprint is determined based on the extracted layers and depth information.

In accordance with one embodiment, as shown at procedure 840, a user is identified and/or authenticated based on the generated data. For example, where an image of a fingerprint is generated, the image of the fingerprint can be compared to a library of fingerprint images. If the generated image matches (e.g., within a confidence level) an image of the library, the user can be identified and/or authenticated.

In addition to providing more detailed fingerprint information, the depth features may also be used to obtain the force or pressure that the user applies with the finger. When the user applies more pressure or force, the features and layers of the skin may be compressed or deformed. For example, FIG. 7A shows an example of the user applying low force, while FIG. 7B shows an example of the user applying a higher force. FIG. 7B illustrates that when a higher force is applied, a compression and deformation of the different layers occurs. This means that the features that can be detected by the sensor may become deformed and their depth position may change. The features can also be displaced. The change in depth position means that a particular feature may change from a first imaging depth to a second imaging depth, where the imaging depths represent the imaging layers at a certain depth which are controlled through the timing of the reflected waves. When determining the depth, a correction may be made for the distance from the sensor to the surface of the cover that the user contacts.

Figure 9:
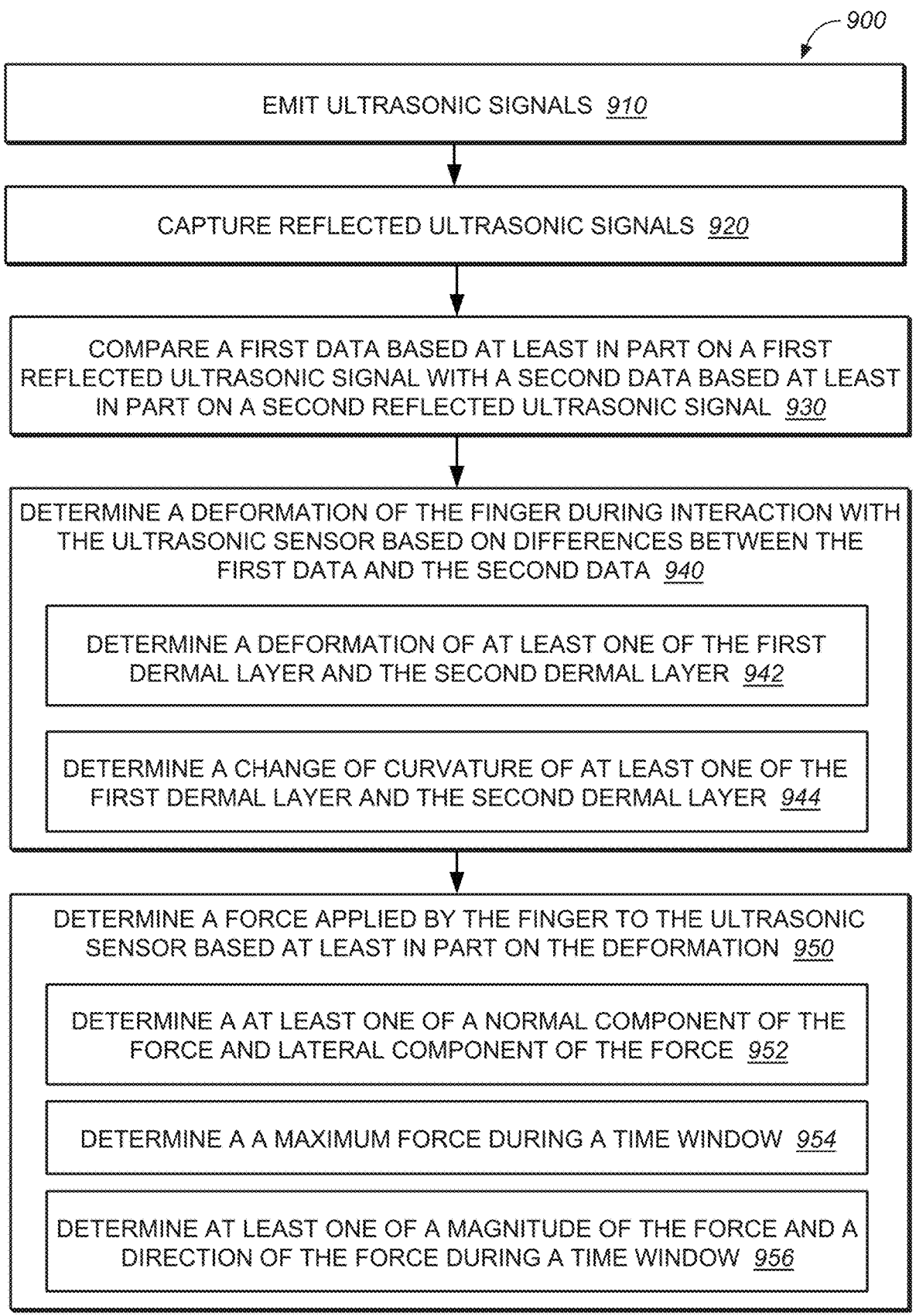
FIG. 9 illustrates a flow diagram of an example method for determining force applied to an ultrasonic sensor, according to various embodiments.

FIG. 9 illustrates a flow diagram of an example method for determining force applied to an ultrasonic sensor, according to various embodiments. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 900 includes some procedures that, in various embodiments, are carried out by one or more processors (e.g., host processor 110 or sensor processor 172 of FIG. 1) under the control of computer-readable and computer-executable instructions that are stored on non-transitory computer-readable storage media. It is further appreciated that one or more procedures described in flow diagram 900 may be implemented in hardware, or a combination of hardware with firmware and/or software.

In one embodiment, at procedure 910 of flow diagram 900, an ultrasonic sensor (e.g., ultrasonic sensor 730 of FIGS. 7A and 7B) emits ultrasonic waves that are reflected from features of the finger (e.g., finger 710 of FIGS. 7A and 7B). Procedure 910 is performed in the same manner as procedure 810 of FIG. 8.

At procedure 920, the reflected ultrasonic waves are detected/captured at the ultrasonic sensor. Procedure 920 is performed in the same manner as procedure 820 of FIG. 8.

At procedure 930, a first data based at least in part on a first reflected ultrasonic signal of the plurality of reflected ultrasonic signals is compared with a second data based at least in part on a second reflected ultrasonic signal of the plurality of reflected ultrasonic signals. In one embodiment, the first data and second data represent at least one characteristic of the reflected ultrasonic signals. In one embodiment, the first data and second data are profiles of at least one characteristic of the reflected ultrasonic signals. In one embodiment, the at least one characteristic represents a feature of the finger derived from the reflected ultrasonic signals. In one embodiment, the at least one characteristic represents a characteristic of the tissue of the finger derived from the reflected ultrasonic signals. In one embodiment, where the reflected ultrasonic signals are captured along a predefined axis, the data represents the at least one characteristic as a function of depth into the finger. In another embodiment, the first data and second data are images. In another embodiment, the first data and the second data are 3D fingerprints. The first data and the second data may be derived from a single reflected ultrasonic signal. For example, the first data may be derived from a first time interval in the reflected ultrasonic signal, and the second data may be derived from a second time interval in the reflected ultrasonic signal. The first data and the second data may also be derived from different reflected ultrasonic signal due to different ultrasonic signals emitted at different times. For example, the first data may be derived from a first reflected ultrasonic signal due to a first emitted ultrasonic signal, and the second data may be derived from a second reflected ultrasonic signal due to a second emitted ultrasonic signal.

At procedure 940, a deformation of the finger during interaction with the ultrasonic sensor is determined based on differences between the first data based at least in part on the first reflected ultrasonic signal and the second data based at least in part on the second reflected ultrasonic signal. It should be appreciated that deformation of the finger may include compression of layers of the finger, compression of features of the finger, a change in curvature of at least one layer of the finger, and/or displacement of features of the finger, individually or in any combination.

Figure 10A:
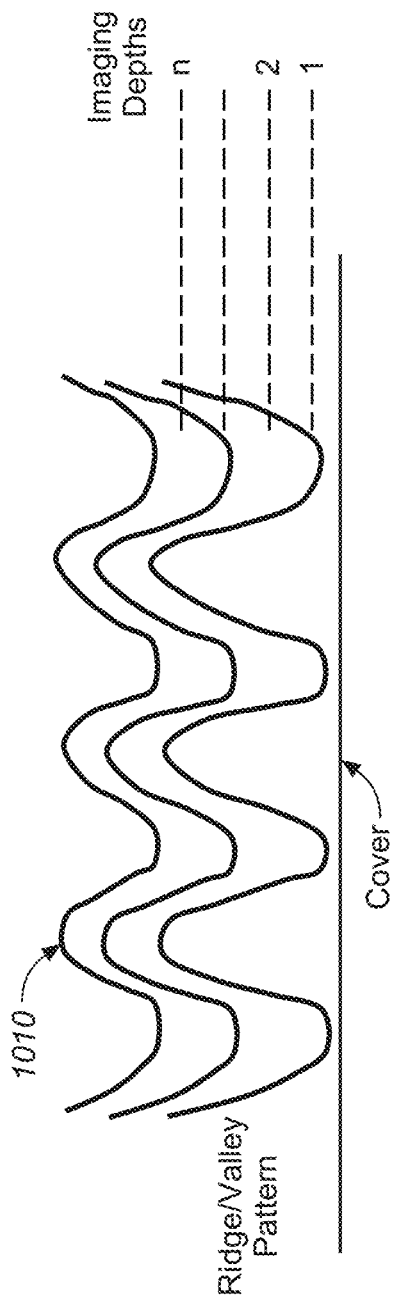
FIGS. 10A and 10B illustrate cross section views of an example ridge/valley pattern of a finger at different forces, according to some embodiments.
Figure 10B:
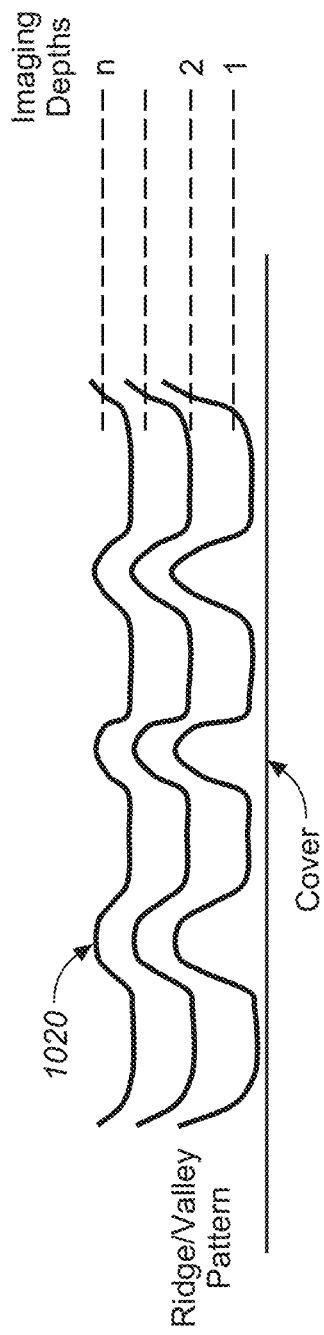

For instance, in one embodiment, as shown at procedure 942, a deformation of at least one dermal layer of the finger is determined. FIGS. 10A and 10B illustrate cross section views of an example deformation of the epidermis and dermal layers (as shown as features 1010 of FIG. 10A and features 1020 of FIG. 10B) at different forces of contact with a cover of an ultrasonic sensor, according to some embodiments. As shown, as the contact pressure increases from FIG. 10A to FIG. 10B, the features of the epidermis and dermal layers are compressed and deformed as a result of the increase in applied force. Accordingly, the deformation of layers of the finger at various depths can be determined based on the differences in the appearance of features of the layers over time due to a change of force over time.

In one embodiment, as shown at procedure 944, a change in the curvature of at least one dermal layer is determined. With reference again to FIGS. 7A and 7B, the curvature of deeper layers 716 in finger 710 differs from the curvature of the deeper layers 726 of finger 710. Due to the higher force applied to finger 710 in FIG. 7B compared to FIG. 7A, the curvature changes. As shown, the layers flatten, and the curvature radius increases. Accordingly, the deformation of layers of the finger at various depths can be determined based on the differences in the curvature of the layers over time.

In one embodiment, based on the extracted depth information, the positions of the layers and/or features are determined as a function of time. By comparing the currently derived position with one or more previous positions, the position change of the layer and/or feature can be determined as a function of time. In addition, any detected deformation of the layers and/or features may be used. Based on the derived compression and/or deformation information, the force applied by the user may be determined. Depending on the settings, the complete sensor surface may be activated, or a smaller section of the sensor (a selection of ultrasonic transducers) may be activated. For example, if identifiable features are only present in one section of the finger, only the corresponding section of the sensor may be activated, with an applied margin to be sure to cover the features of interest.

At procedure 950, a force applied by the finger to the ultrasonic sensor is determined based at least in part on the deformation. In one embodiment, as shown at procedure 952, at least one of a normal component of the force and lateral component of the force is determined. A normal component of force represents the force applied directly into ultrasonic sensor (e.g., perpendicular to the ultrasonic sensor). The normal component of force can be determined based on the deformation of the finger (e.g., deformation of features of the epidermis and/or dermal layers of the finger). A lateral component of force represents the force exerted by the finger parallel to the surface of the ultrasonic sensor. The lateral component of force can be determined based on the movement of features of the finger (e.g., features of the epidermis and/or dermal layers) relative to the surface of the ultrasonic sensor. In other embodiments, the force may be determined along a predefined axis or decomposed with respect to another reference frame, which may be tied to the sensor or to the finger.

In one embodiment, as shown at procedure 954, a maximum force during a time window is determined. It should be appreciated that any interaction between a finger and an ultrasonic sensor can generate a force. The maximum force within a time period (e.g., between a finger initiated interaction with the ultrasonic sensor and the finger completing interaction with the ultrasonic sensor) is determined for providing interactive application inputs, etc. The maximum force is the greatest force applied, where the maximum force is determined as the greatest deformation of features of the finger. In some embodiment, the maximum force is determined by detecting a (local) maximum in the deformation. In order words, as soon as the force/deformation starts to decreases, the maximum force can be determined. In some embodiments, a force above a certain threshold may be used to trigger and action, without waiting to achieve a maximum. This embodiment would have a decreased latency.

In one embodiment, as shown at procedure 956, at least one of a magnitude of the force and a direction of the force during a time window is determined. The magnitude of the force and/or the direction of the force can be determined based on the deformation of the finger (e.g., deformation of features of the epidermis and/or dermal layers of the finger) and/or the movement of features of the finger (e.g., features of the epidermis and/or dermal layers) relative to the surface of the ultrasonic sensor.

In one embodiment, to determine the force, an absolute curvature of one or more layers may be determined, and monitored over time. Alternatively, to determine the force, a relative change of curvature of a first layer compared to a second layer may be determined, and monitored over time. A calibration process may be used to determine the relation between the curvature and the force, and this calibration process may also include a step to determine the best layer to use for the force calculation.

In one embodiment, to determine the force, an absolute position of one or more layers or features may be determined, and monitored over time. Alternatively, to determine the force, a relative change of a position of a first layer/feature compared to a second layer/feature may be determined, and monitored over time. A calibration process may be used to determine the relation between the position and the force, and this calibration process may also include a step to determine the best layer or features to use for the force calculation.

In some embodiments, a calibration process may be performed where the user is asked to perform different interactions with the sensor, covering the range of force relevant for the user. The calibration may be applied to one or more fingers. The calibration process may be used to perform extensive scans in order to locate layers and features of interest to determine the force. The information may be used to optimize the force detection process by knowing which features and layers work best and give most reproducible results. This calibration process may require a large amount of processing and power resources, but has the purpose of optimizing the force detection process to use as little as possible resources, while still having the required results. In accordance with various embodiments, the calibration process includes at least one of: determining a maximum of the force applied by the finger, identifying a suitable feature of the finger to determine the force, identifying a suitable dermal layer to determine the force, and determining a relationship between the deformation and the force.

Imaging algorithms may be used to detect certain features and layers in generated data (e.g., depth profiles, images or 3D fingerprints) and determine how these features change in depth during the application of the force. In one embodiment, images of different depths may be produced by analyzing the reflected waves in certain time intervals, wherein each time interval corresponds to an image at a certain imaging depth. When the force is applied, features may change from one image (depth) to another image (depth). By detecting in which image a feature is detected as a function of time, the force may be determined as a function of time. In one example, the images may be numbered, and each number corresponds to a certain imaging depth, and the result of the image algorithm is an image number as a function of time, which is then converted to a depth as a function of time. Some features may be three-dimensional and cover more than a single image. The change in depth may also be interpolated between different images, for example, resulting in non-integer results of the image numbers. Image analysis of feature of the finger may be used to determine deformation of the features. For example, polynomial or other shape fitting algorithms may be used to determine the shape of features, and then the change of the shape, or the parameters describing the shape, may be used to determine the deformation.

In another embodiment, features may be determined directly in the reflected ultrasonic signals, without first converting the reflected data into images at different depth. In this algorithm, the reflection time of the detected feature is derived, and when the force changes, this reflection time changes. For example, when more force is applied, the reflection time decreases. In one example, the different pixels captured by the ultrasonic sensor may be grouped in order to facilitate the processing of the data and determining the change, e.g., intensity patterns of the grouped pixels. Patterns may be detected in the reflected ultrasonic signals, and the timing characteristics, or change in timing characteristics, of these patterns may be used to derive the force. For example, the patterns may be compressed or the time delay of the patterns may change. This analysis may be done per pixel or per group of pixels. In one embodiment, the change or shift of the pattern of the characteristics of the signal along a predefined axis may be used to determine the force.

In some embodiments, features may be recognized for determining the depth position of these features over time. In other embodiments, the algorithms may be designed to determine a plurality of features, and determined the relative depth of these features with respect to each other. For example, features of different depth would be pressed closer together when more force is applied. In other embodiments, the algorithms may be designed to analyze the deformation of layers and/or features, and determine the force by the amount of deformation. In some embodiments, a first force may be determined based on the deformation of features, and a second force may be determined based on a change of position of feature or compression of layers. A weighted average of the first force and the second force may then be determined, where the weight may depend on, e.g., the confidence or quality of the calculation. The weights may also depend on the user, or maybe which finger the user is using. Different combinations and weights may be better for some users of fingers of the users. These weights may be determined during calibration.

In some embodiments, the relation between the compression/deformation and the force may be determined as an average of a group of users and predefined in the system. The average group of users may be adjusted depending on demographics or user profiles. Alternatively, the relation may be adaptive as the system will learn the range of compression/deformation for each user, and adapt the relationship accordingly. In other words, the maximal measured force/deformation may be stored and used for future reference. The force may be given as a simple binary result, e.g., a low force or high force, or the force may be given with a (predefined) number of levels. The number of levels may be adaptively distributed evenly over the range of force of the user.

In some embodiments, the thermal coupling between the finger and the ultrasonic sensor, and the change of the thermal coupling as a function of the force or pressure may be used in addition to the force determined from the deformation. For example, a finger and a surface of an ultrasonic sensor can have a significantly different temperature. Physics of sound waves propagation in solid materials illustrate a relationship between temperature of traveled layers and the ultimately collected ultrasound signal. Young's modulus (thus sound velocity), scattering coefficients, interface impedances are examples of material characteristics affecting the signal and that can significantly change with temperature. This effect can be used to determine the "efficiency" of the thermal coupling, and thus finger pressure because the coupling increases with increased pressure. Therefore, by deducing the thermal coupling based on the ultra-sound signals, the applied pressure can be deduced. This information can be combined with information about the pressure obtained from other techniques describe here. The piezoelectric material itself can have behavior changes with temperature. Temperature sensors in the sensor itself or in the host device (e.g., a smartphone) may provide temperature information needed for the calculation of the pressure. Based on the temperature measurement and the thermal coupling, the expected behavior of the ultrasonic waves as a function of the temperature and force can be predicted and/or modeled to improve the accuracy of the measurements (or images), e.g., bias and/or drift correction as a function of temperature.

FIGS. 10A and 10B illustrate cross section views of an example ridge/valley pattern of a finger at different forces, according to some embodiments. The detection of the features discussed above may be limited to the surface features of the finger, such as the actual ridges and valleys of the surface of the finger. A depth analysis may be limited to approximately the height of the fingerprint structures. By pressing the finger against the surface (e.g., cover) of the ultrasonic sensor, the ridge/valley pattern may be modified or compressed, which can then be detected and used to determine the applied force. For example, the air cavity due to the valleys may be decreased due to the applied force, and the surface ratio of the ridges and valleys may be changed. The shape of the ridges may also change due to the applied force, and this change may be determined through the depth analysis using the sensor. Thus, the change of shape of the ridge and valleys due to compression and/or deformation can be used to derive the applied force. In one example, the determined contact surface may be used to derive the applied force. FIG. 10A shows an example of the ridge/alley pattern at low-force, shown as features 1010, and FIG. 10B shows the same pattern, shown as features 1020, at a higher force where the pattern is compressed leading to a greater contact surface and smaller valleys.

In some embodiments, the analysis of the ridge/valley pattern and the analysis of deeper layers and/or features may be combined. In some embodiments, each analysis may be performed separately, and then the results may be combined, for example, by averaging or weighted averaging. The applied weight may depend on the obtained results and a confidence factor. The different algorithms may produce a confidence factor of the determined force, and the higher the confidence factor the higher the weight in the averaging. In other embodiments, the different algorithms may also be performed sequentially. For example, a first algorithm may determine the force, and a certain confidence factor. The second algorithm may only be used in case the confidence factor is below a preset threshold. For each analysis the active section of the sensor may be adapted, for example, only a central section of the sensor may be used. In one embodiment, results from the surface analysis to determine the force may help determine the best location to perform an in depth analysis.

Figure 11:
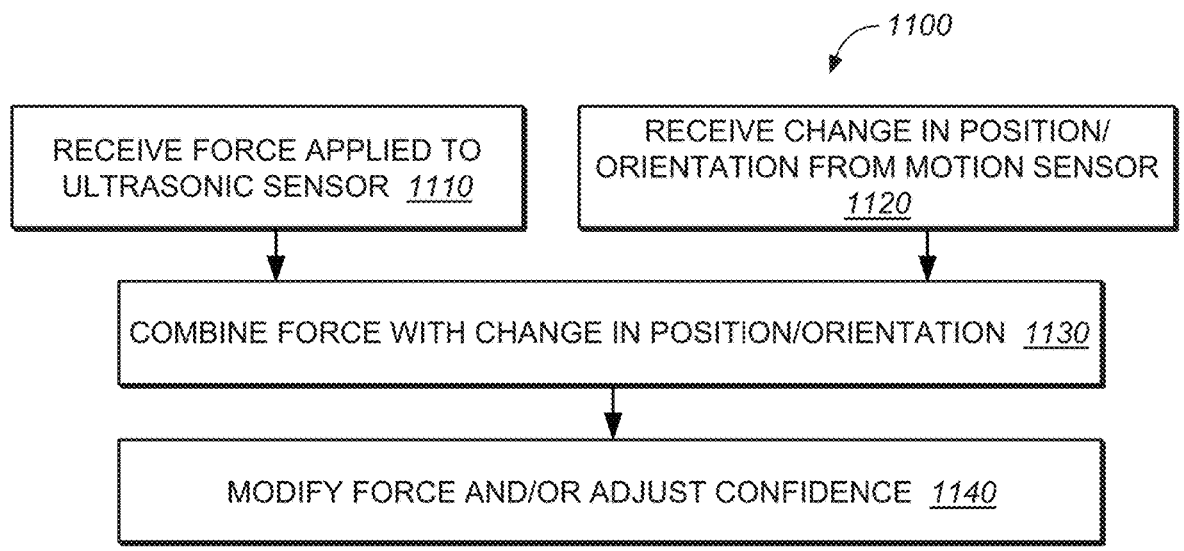
FIG. 11 illustrates a flow diagram of an example method for combining data from an ultrasonic sensor with data from another sensor, according to various embodiments.

The data from the ultrasonic sensor may also be combined with data from other sensors to deduce the force of the pressing action of the user. FIG. 11 illustrates a flow diagram 1100 of an example method for combining data from an ultrasonic sensor with data from another sensor (e.g., a motion sensor), according to various embodiments. By combining the force determined by the ultrasonic sensor with a change in orientation or position, the determined force may be modified or the confidence factor may be adjusted. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 1100 includes some procedures that, in various embodiments, are carried out by one or more processors (e.g., host processor 110 or sensor processor 172 of FIG. 1) under the control of computer-readable and computer-executable instructions that are stored on non-transitory computer-readable storage media. It is further appreciated that one or more procedures described in flow diagram 1100 may be implemented in hardware, or a combination of hardware with firmware and/or software.

At procedure 1110 of flow diagram 1100, the force applied to the ultrasonic sensor is received (e.g., the force determination of flow diagram 900 of FIG. 9). At procedure 1120, a change in position and/or orientation is received from a motion sensor of the electronic device. The motion sensor may be an accelerometer or a gyroscope, and the detected motion may be a linear acceleration or an angular acceleration, respectively. For example, with reference to FIG. 1, sensor 180-1 may be an accelerometer, and sensor 180-2 may be a gyroscope. The accelerometer data and gyroscope data may also be combined in a fusion process. Operation of the motion sensors may be activated when the user starts touching the ultrasonic sensor, or when a first method determines a force above a certain threshold, so that the motion sensor can be used for the remainder of the force process. In some embodiments, the accelerometer may be active all the time, since it consumes less energy, and then the gyroscope, which consumes more energy, may be activated selectively as just discussed based on detection of the finger or a threshold force.

At procedure 1130, the force determination is combined with the information received from the motion sensor. For example, if the electronic device is equipped with a motion sensor (e.g., accelerometer or gyroscope of sensor 180 of FIG. 1), the pressing action of the user may also lead to a change of position or orientation of the electronic device. The larger the pressing force of the user, the larger the change in position or orientation may be. The motion induced by the application of the force may depend on how the user is holding the device and where the sensor is positioned. The context of the information received from the motion sensor determines how the data is combined with the force determination. The system may look for a predetermined type of motion pattern, rotation, or gesture. The system may be a learning system and learn the correlation between the observed motion and the force determined using the deformation. For example, if the electronic device is resting on a surface, information received from the motion sensor may be disregarded. The context may be determined based on the accelerometer, and the gyroscope may be selectively activated. Other sensors may also be used to determine the context, such as e.g. proximity sensors, light sensors, audio sensors, pressure sensors. As such, the motion data may have less weight in the initial learning stage, but as confidence is built, the weight of the motion data may increase in the final determination of the force.

At procedure 1140, the force determination may be modified and/or the confidence of the force determination may be adjusted. It should be appreciated that the combination with motion sensor may not yield additional information is all situations. For example, if the user is holding the device in his or her hands while pressing the button a change in position/orientation may be detected, but if the device is lying on a hard flat surface, no such change may be detected. Context detection may be used to determine if the additional (motion) sensor data may be combined with the ultrasonic data. The context detection may be incorporated in the learning process described above.

In an embodiment of the invention, the effects of finger pressure on the sound propagation may be used to assess the pressure or force indirectly. These indirect effects can be mechanical (e.g., soft layers can be compressed at a point to which sound velocity, time-of-flight, and/or interface impedance change in a measurable way), or thermal (e.g., in materials with high thermal expansion and low calorific capacity and conductance, such as polymers, sound propagation will quickly change with finger pressure). Pressure and/or temperature changes in propagation layers may induce alteration to the ultrasonic signals. These effects can be used as additional information for estimating thermal coupling with the finger, closely related to finger pressure.

In embodiments of the invention where the ultrasonic sensor uses piezoelectric materials, the force applied by the user may cause a deformation of the piezoelectric material. If this deformation leads to detectable electric signals, these signals may also be used as a measure for force. Again, a certain learning or calibration phase may be performed to align these force measurements with other force measurements discussed above if necessary.

In some embodiments, several of the force measurement methods above may be combined based on the context and/or user. The contribution of the different force measurements to the final determined force may depend on the confidence of the determined force and the suitability of the different methods to the context.

In addition to using the ultrasound fingerprint sensor to determine the identity of the user and determine the force applied by the user, the sensor may also be used for navigation. In one embodiment, where the user moves the finger across the surface of the sensor, the lateral displacement of the ridge/valley pattern across the field of view of the sensor may be used for navigation purposes. For example, to navigate buttons, menus, moving a cursor on a screen, or controlling other functions of the device. When the user applies little force, features of the finger (e.g., the ridge/valley pattern) are moved over the surface of the sensor without any distortion due to the lack of friction and adhesion of the finger to the surface. The threshold of force below which the no deformation occurs depends on the surface material characteristics, e.g., surface roughness.

In another embodiment, when the user applies a normal force into the ultrasonic sensor and moves the finger, the surface of the finger may not move with respect to the sensor due to static friction. In this situation the user may still be able to move the finger, albeit with smaller amplitude then when a small force is applied, but instead of translation of the finger, distortion or deformation of the finger is observed. For example, the contact region of the finger changes without features of the finger moving laterally relative to the surface of the ultrasonic sensor. This lateral distortion may be used to determine how much the user moves the actual structure (e.g., bone) of the finger, while the skin remains immobile due to the static friction. The distortion of the finger may be determined using the techniques discussed above to determine the compression and distortion due to force, but in this case the lateral distortion or deformation is measured. In an intermediate force regime, the finger is moved in a jerking fashion due to the buildup and release of the static friction. In this case, the movement is a combination of deformation and translation, which may alternate in a temporal fashion.

Figure 12A:
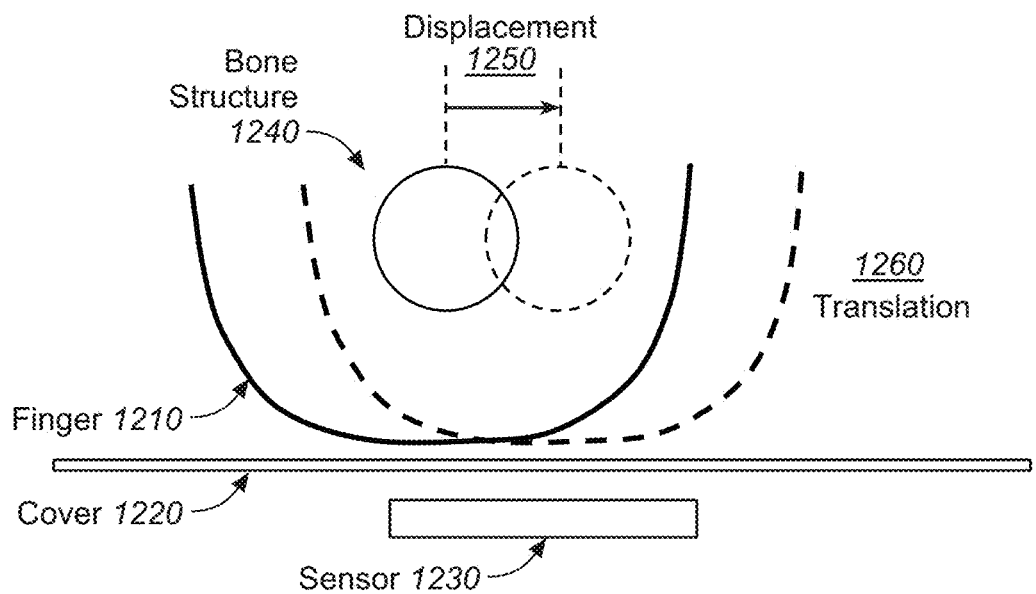
FIGS. 12A and 12B illustrate cross section views of translation of a finger relative an example ultrasonic sensor at different forces, according to some embodiments.
Figure 12B:
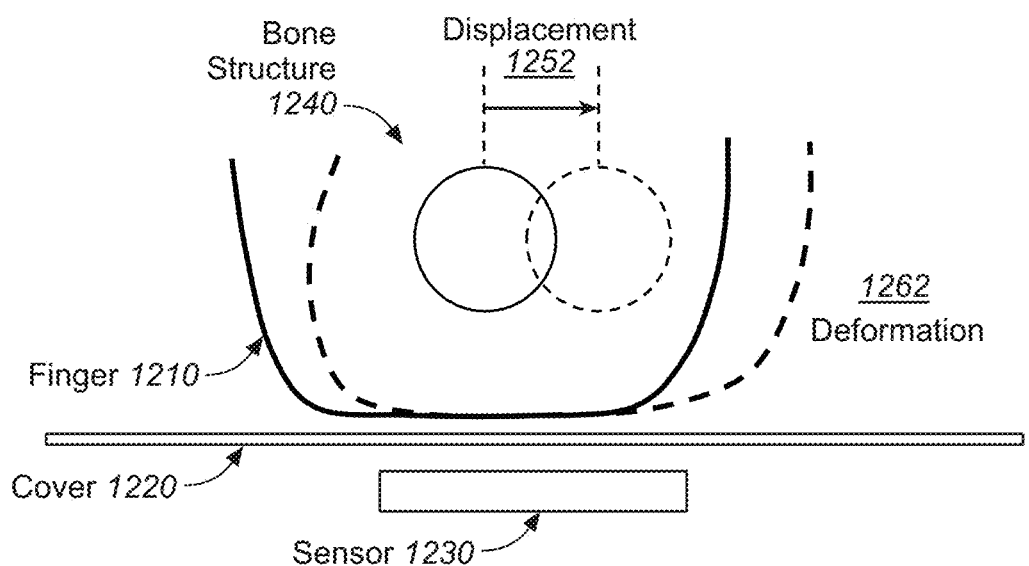

FIGS. 12A and 12B illustrate cross section views of translation of a finger 1210 relative an example ultrasonic sensor 1230 at different forces, according to some embodiments. FIG. 12A shows an example of the translation 1260 of finger 1210 of the user when little force is applied and finger 1210 is moved laterally. The shape of the 1210 is not modified (or slightly modified) during the lateral displacement 1250. FIG. 12B shows an example of the deformation 1262 of finger 1210 of the user when a larger force is applied and finger 1210 is moved laterally. Due to the static friction, the surface of finger 1210 remains static with respect to the cover 1220 while structure 1240 of finger 1210 (e.g., the bone) is moved. This causes the deformation or distortion of the shape of finger 1210 during the lateral displacement 1252.

During the low-force lateral displacement, the field of view of the ultrasonic sensor may cover a continuously changing section of the ridge/valley pattern of the finger. Therefore, the navigation functionality also is an opportunity to record a larger section of the fingerprint of the user than when the user just puts his or her finger on the ultrasonic sensor in a static manner. Even when the user applies a higher force and deforms the finger, the contact surface is increased and may reveal a section of the fingerprint that is only available at low force when the user rotates his or her finger on the ultrasonic sensor because these sections are normally on the side of the finger. In short, this means that both navigation modes may provide the opportunity to obtain a larger fingerprint than the surface of the ultrasonic sensor.

In accordance with various embodiments, the force determination and/or the lateral movement of the finger, can be used to provide navigation functionality on a display of an electronic device communicatively coupled to the ultrasonic sensor. In some embodiments, the sensor may be used in a dual navigation or displacement detection mode. This dual mode may comprise a first mode of finger translation when the user applies little force and the finger undergoes a translation, and a second mode of finger distortion when the user applies a large force and the finger is distorted. The system may determine which mode the user is using, and may react and/or process the displacement data differently. For example, in navigation applications the different modes may be coupled with different navigation gains, where e.g. the low-force translation mode is used for large scale navigation and the high-force distortion mode is used for more precise small scale navigation (or vice-versa). Alternatively, one of the modes may be linked to cursor navigation and the other mode may be linked to menu navigation. In another example, the low-force mode may be used for navigation icons or menu items, and the large-force mode may be used for moving the items.

Figure 13:
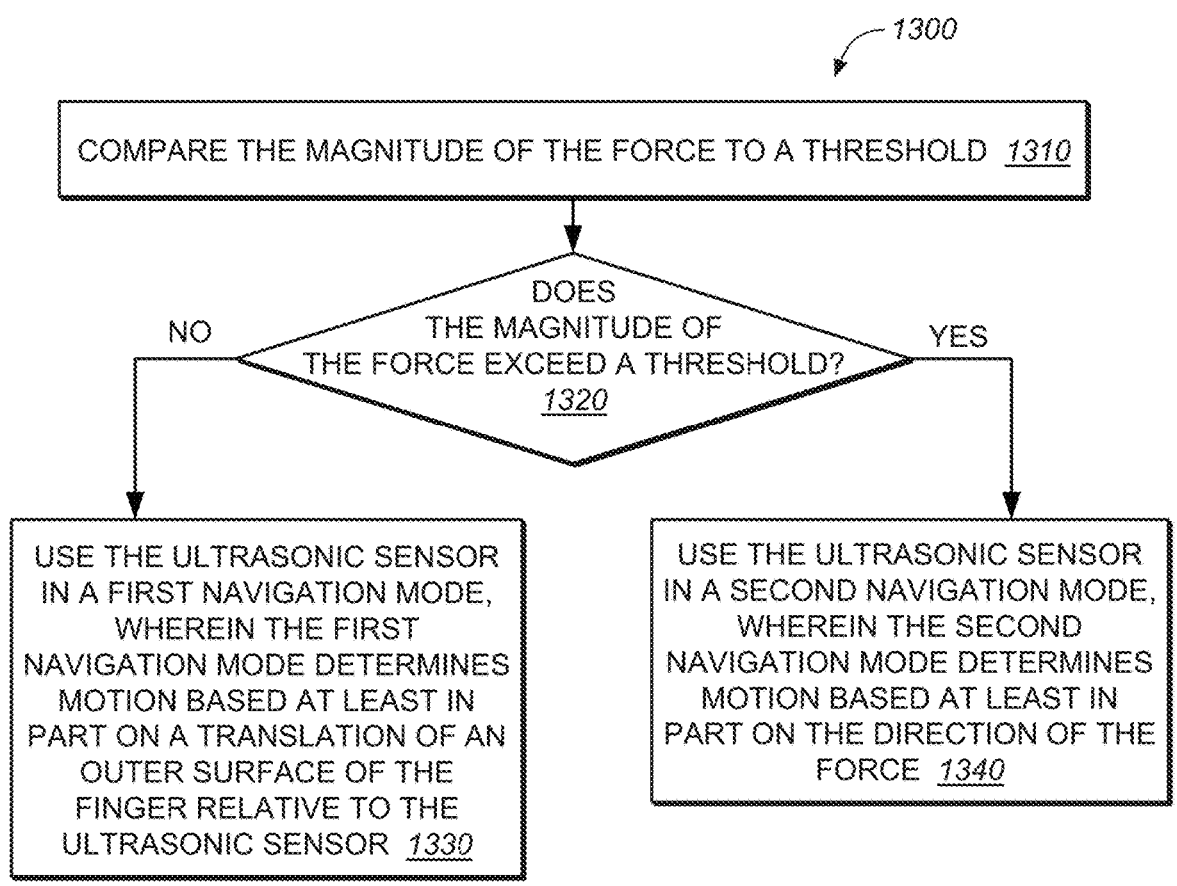
FIG. 13 illustrates a flow diagram of an example method for using the force to provide navigation functionality on a display of an electronic device, according to various embodiments.

FIG. 13 illustrates a flow diagram 1300 of an example method for using the force to provide navigation functionality on a display of an electronic device, according to various embodiments. By combining the force determined by the ultrasonic sensor with a change in orientation or position, the determined force may be modified or the confidence factor may be adjusted. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 1300 includes some procedures that, in various embodiments, are carried out by one or more processors (e.g., host processor 110 or sensor processor 172 of FIG. 1) under the control of computer-readable and computer-executable instructions that are stored on non-transitory computer-readable storage media. It is further appreciated that one or more procedures described in flow diagram 1300 may be implemented in hardware, or a combination of hardware with firmware and/or software.

At procedure 1310, the magnitude of the force is compared to a threshold. The purpose of this comparison is to determine if the finger is static relative to the surface of the ultrasonic sensor or if the finger is moving laterally relative to the surface of the ultrasonic sensor. At procedure 1320, it is determined whether the magnitude of the force exceeds the threshold.

In one embodiment, if the magnitude of the force does not exceed the threshold, as shown at procedure 1330 the ultrasonic sensor is used in a first navigation mode, wherein the first navigation mode determines motion based at least in part on a translation of an outer surface of the finger relative to the ultrasonic sensor. The first navigation mode is also referred to herein as "motion mode."

Motion mode is similar to the use of a touchpad. The motion of the finger across the ultrasonic sensor is directly related to the motion of the cursor, and the position or change of position of the finger on the ultrasonic sensor is linked to a position or change of position of a cursor (or other virtual object) on a screen (as depicted in FIG. 12A). In other words, the motion vector of the cursor on the screen (MVC) is obtained by applying a gain k to the motion vector of the finger on the sensor (MVF): MVC=k*MVF. The gain may be constant, or may be dependent on the application. For example for applications that required large amplitudes, the gain k may be set at a larger value, and for applications that requires small precise movement, the gain k may be set at a smaller value. In addition, the gain may depend on the applied force, where a larger force may increase or decrease the gain as desired. The force should not be so large as to prevent the moving of the finger across the surface. If the force is not used to determine the gain, and only the translation of the outer surface is relevant, the sensor may be adapted only the measure the outer surface. Because of the small size of the sensor, a desired cursor displacement with a large amplitude may require multiple subsequent 'swipes' across the sensor by the user. In between the multiple swipes of the finger, the cursor movement may be continued in the direction of the previous swipe to allow for a continuous cursor motion even though the multiple finger swipes are of a discontinuous nature. This type of simulated movement may not be constant but rather have a decaying velocity, which means that the cursor movement slow down and comes to a stop after the last of the series of swipes.

In one embodiment, if the magnitude of the force exceeds the threshold, as shown at procedure 1340 the ultrasonic sensor is used in a second navigation mode, wherein the second navigation mode determines motion based at least in part on a direction and/or magnitude of an applied force. The second navigation mode may be selected from one of the two following described modes, referred to herein as "position mode" and "arrow mode." In one embodiment, it may be verified that an outer surface of the finger does not move substantially compared to the sensor, and a displacement threshold may be used. If the finger moves further than the displacement threshold, the system may exit the second navigation mode, and may enter the first navigation mode.

Position mode is similar to the use of a trackball or joystick. To overcome the problems of larger amplitude movement as described in the first mode above, in this mode the motion of the cursor on the display is based on the position of the finger, or position change of the finger, on the ultrasonic sensor. In this mode, the initial position where the finger touches the ultrasonic sensor is stored, and the difference of position with this initial reference position is used to control the cursor. The speed and direction of the motion of the cursor is deduced from the difference with the reference position. The larger the difference with the initial position, the larger the speed of the cursor. A gain k may be applied between the vector PD expressing the position difference and the motion vector of the cursor (MVC): MVC=k*PD. In addition, the gain may depend on the applied force, where a larger force may increase or decrease the gain as desired. When the applied force is such that the surface of the finger does not move, and the finger deforms laterally, as indicated in FIG. 12B, the lateral force may be used to determine the motion. The normal force may in addition be used to control the gain.

Arrow mode is similar to the position mode, but instead of applying a gain between the position difference and the motion vector of the cursor, a thresholding technique is applied. This means that if the difference with the initial position exceeds a predefined threshold (which may depend on the direction), a dedicated function such as imitation of a keyboard arrow press is activated. The movement of the finger with respect to the initial position can therefore mimic keyboard presses, e.g., arrow presses. Alternatively, when a threshold position difference is surpassed, the cursor may be 'launched' in the corresponding direction until a second event is detected that stops the started motion. This second event may be a motion in the opposite direction or a change of the applied force. The speed of the launched motion may depend on the applied force.

The selection of a particular mode may be done based on the applied (initial) force. For example, a force below a predefined threshold may operate the fingerprint sensor in the first mode, while a force above a certain pressure may operate the fingerprint sensor in the second mode. Alternatively, the motion of the finger at the initial stages of the contact with the sensor may determine the mode. A motion below a first threshold may select the second mode, and a motion above the first threshold may select the first mode. Additionally, a motion above a second threshold, higher than the first threshold, may select the third mode where the detected motion is used to mimic a button press. Alternatively, the modes may be selected by e.g. tapping functions, certain finger gestures (e.g. swipe up), or may be defined depending on the application or the user preferences. The selection of the modes in relating to the force may also be determined by the context, the applications, or the preferences of the user.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for determining force applied to a sensor, the method comprising:
   receiving a plurality of sensor signals from a sensor, the plurality of sensors signals from a finger interacting with the sensor;
   comparing a first data based at least in part on a first sensor signal of the plurality of sensor signals captured at a first time with a second data based at least in part on a second sensor signal of the plurality of sensor signals captured at a second time;
   determining a deformation of the finger during interaction with the sensor based on differences between the first data based at least in part on the first sensor signal and the second data based at least in part on the second sensor signal; and
   determining a force applied by the finger to the sensor based at least in part on the deformation.

2. The method of claim 1, wherein the first data comprises at least one characteristic of the first sensor signal and the second data comprises the at least one characteristic of the second sensor signal.

3. The method of claim 2, wherein the at least one characteristic represents a feature of the finger derived from at least one of the first sensor signal and the second sensor signal.

4. The method of claim 2, wherein the first data and the second data represent the at least one characteristic as a function of depth.

5. The method of claim 4, wherein the first data represents the at least one characteristic as a function of depth for at least one position of the finger.

6. The method of claim 2, wherein the determining a deformation of the finger during the interaction with the sensor is based at least in part on a difference between the at least one characteristic of the first data and the at least one characteristic of the second data.

7. The method of claim 1, wherein the determining a deformation of the finger during the interaction with the sensor is based on at least one of a deformation of a feature of the finger, and a displacement of a feature of the finger.

8. The method of claim 7, wherein the feature of the finger comprises a ridge/valley of the finger.

9. The method of claim 1, wherein the first data comprises at least one image and the second data comprises at least one image.

10. The method of claim 9, wherein the first data comprises a plurality of images and the second data comprises a plurality of images, and wherein each image of the plurality of images corresponds to a different depth.

11. The method of claim 9, wherein the at least one image of the first data and the at least one image of the second data represent a cross section of the finger.

12. The method of claim 9, wherein the first data comprises an image of a first dermal layer of the finger, and the second data comprises an image of a second dermal layer of the finger.

13. The method of claim 12, wherein the determining a deformation of the finger during interaction with the sensor comprises:
determining a deformation of at least one of the first dermal layer and the second dermal layer.

14. The method of claim 1, wherein determining a deformation of the finger during interaction with the sensor comprises:
determining a change of curvature of a dermal layer.

15. The method of claim 1, wherein the determining a force applied by the finger to the sensor comprises:
determining at least one of a normal component of the force and lateral component of the force.

16. The method of claim 1, wherein the determining a force applied by the finger to the sensor comprises:
determining at least one of a maximum of the force, a magnitude of the force and a direction of the force during a time window.

17. The method of claim 16, wherein the time window comprises the finger contacting the sensor until the finger separates from the sensor.

18. The method of claim 1, further comprising:
using the force to provide navigation functionality on a display of an electronic device communicatively coupled to the sensor.

19. The method of claim 18, wherein the using the force to provide navigation functionality on a display of an electronic device communicatively coupled to the sensor comprises:
comparing a magnitude of the force to a threshold;
provided the magnitude of the force does not exceed the threshold, using the sensor in a first navigation mode, wherein the first navigation mode determines motion based at least in part on a translation of an outer surface of the finger relative to the sensor; and
provided the magnitude of the force exceeds the threshold, using the sensor in a second navigation mode, wherein the second navigation mode determines motion based at least in part on a direction of the force.

20. The method of claim 18, wherein the navigation functionality is activated automatically responsive to an application executing on the electronic device.

21. The method of claim 1, further comprising:
receiving sensor data from another sensor;
combining the force with the sensor data; and
modifying the force based on the sensor data.

22. The method of claim 21, wherein the another sensor is a motion sensor and wherein the sensor data comprises a change in orientation of the sensor based on the force applied by the finger to the sensor.

23. The method of claim 21, wherein the combining the force with the sensor data is based at least in part on a context of the sensor data.

24. The method of claim 21, wherein the another sensor is activated for determining the sensor data responsive to the finger interacting with the sensor.

25. The method of claim 1, further comprising:
calibrating the sensor, the calibrating comprising at least one of:
determining a maximum of the force applied by the finger;
identifying a suitable feature of the finger to determine the force;
identifying a suitable dermal layer to determine the force; and
determining a relationship between the deformation and the force.

26. The method of claim 1, wherein the sensor is an ultrasonic sensor.

27. An electronic device comprising:
a sensor for generating sensor signals responsive to a finger interacting with the sensor;
a processor capable of determining force applied to the sensor by the finger, wherein the processor is operable to:
compare a first data based at least in part on a first sensor signal of the sensor signals with a second data based at least in part on a second sensor signal of the sensor signals;
determine a deformation of the finger during interaction with the sensor based on differences between the first data based at least in part on the first sensor signal and the second data at least in part based on the second sensor signal; and
determine a force applied by the finger to the sensor based at least in part on the deformation.

28. The electronic device of claim 27, wherein the processor is further operable to detect a fingerprint of the finger based at least in part on one of the first data and the second data.

29. The electronic device of claim 27, wherein the processor is further operable to adapt beam forming of the sensor signals to a predetermined depth into the finger.

30. The electronic device of claim 27, further comprising:
a display device, wherein the processor is further operable to provide navigation functionality on the display device based at least in part on the force.

31. The electronic device of claim 27, further comprising:
a motion sensor configured to determine a change in orientation of the sensor, wherein the processor is further operable to determine the force applied by the finger to the sensor based at least in part on the deformation and the change in orientation of the sensor.

32. A sensor processing unit comprising:
a sensor for generating sensor signals responsive to a finger interacting with the sensor;
a sensor processor capable of determining force applied to the sensor by the finger, wherein the sensor processor is operable to:

compare a first data based at least in part on a first sensor signal of the sensor signals with a second data based at least in part on a second sensor signal of the sensor signals;

determine a deformation of the finger during interaction with the sensor based on differences between the first data based at least in part on the first sensor signal and the second data at least in part based on the second sensor signal; and determine a force applied by the finger to the sensor based at least in part on the deformation.

33. The sensor processing unit of claim 32, wherein the sensor processor is further operable to:

obtain motion sensor data from a motion sensor;

determine a change in orientation of the sensor based on the motion sensor data; and determine the force applied by the finger to the sensor based at least in part on the deformation and the change in orientation of the sensor.

34. The sensor processing unit of claim 32, further comprising:

an interface, wherein the sensor processor is further operable to output the force to components of an electronic device over the interface.

35. The sensor processing unit of claim 32, further comprising:

an interface, wherein the sensor processor is further operable to output navigation data to components of an electronic device over the interface.

* * * * *